US007045773B2

(12) United States Patent
Suzuki et al.

(10) Patent No.: US 7,045,773 B2
(45) Date of Patent: May 16, 2006

(54) OPTICAL SCANNING APPARATUS FOR ACCURATELY DETECTING AND CORRECTING POSITION OF OPTICAL BEAM IN SUBSCANNING DIRECTION, AND THE METHOD

(75) Inventors: Mitsuo Suzuki, Kanagawa (JP); Seizo Suzuki, Kanagawa (JP); Satoru Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 19 days.

(21) Appl. No.: 10/892,191

(22) Filed: Jul. 16, 2004

(65) Prior Publication Data

US 2005/0045813 A1    Mar. 3, 2005

(30) Foreign Application Priority Data

Jul. 18, 2003    (JP) .............................. 2003-198922
Aug. 18, 2003    (JP) .............................. 2003-294246

(51) Int. Cl.
  *H01J 3/14*    (2006.01)
  *H01J 40/14*    (2006.01)
  *H01J 5/16*    (2006.01)

(52) U.S. Cl. ........................ 250/234; 359/212; 347/256

(58) Field of Classification Search ........ 250/234–236; 359/196, 212, 205–207, 216–219; 347/256–261; 235/462.22–462.23, 462.32–462.39
See application file for complete search history.

(56) References Cited

U.S. PATENT DOCUMENTS

| 4,726,640 | A |  | 2/1988 | Iwama et al. |
| 4,953,171 | A |  | 8/1990 | Nakajima et al. |
| 4,995,710 | A |  | 2/1991 | Suzuki et al. |
| 5,005,928 | A |  | 4/1991 | Suzuki et al. |
| 5,069,515 | A |  | 12/1991 | Itami et al. |
| 5,331,147 | A | * | 7/1994 | Mizuno et al. .......... 250/208.2 |
| 5,355,244 | A |  | 10/1994 | Suzuki et al. |
| 5,371,608 | A | * | 12/1994 | Muto et al. .................. 358/412 |
| 5,453,650 | A |  | 9/1995 | Hashimoto et al. |
| 5,459,601 | A |  | 10/1995 | Suzuki et al. |
| 5,510,664 | A |  | 4/1996 | Suzuki et al. |
| 5,539,719 | A | * | 7/1996 | Motoi ..................... 346/107.1 |
| 5,546,216 | A |  | 8/1996 | Suzuki |
| 5,574,591 | A |  | 11/1996 | Suzuki et al. |

(Continued)

FOREIGN PATENT DOCUMENTS

JP    7-72399    3/1995

(Continued)

*Primary Examiner*—Stephone B. Allen
*Assistant Examiner*—Patrick J. Lee
(74) *Attorney, Agent, or Firm*—Oblon, Spivak, McClelland, Maier & Neustadt, P.C.

(57) ABSTRACT

An optical scanning apparatus is provided, in which the optical scanning apparatus includes: a light source emitting an optical beam; an optical deflection unit deflecting the optical beam emitted from the light source; a scanning optical arrangement scanning a scanned surface by the optical beam in a main scanning direction; and an optical beam detection unit detecting the optical beam moving in the main scanning direction. The optical beam detection unit includes a first photodetector and a second photodetector, and the first photodetector including a first part and a second part that are electrically connected, wherein a first gap is formed between an edge of the first part and a first edge of the second photodetector, a second gap is formed between an edge of the second part and a second edge of the second photodetector, and the first gap and the second gap are not parallel to each other.

27 Claims, 15 Drawing Sheets

U.S. PATENT DOCUMENTS

| | | | |
|---|---|---|---|
| 5,606,181 | A | 2/1997 | Sakuma et al. |
| 5,606,448 | A | 2/1997 | Suzuki et al. |
| 5,612,599 | A | 3/1997 | Itami et al. |
| 5,717,511 | A | 2/1998 | Suzuki |
| 5,726,669 | A | 3/1998 | Itami et al. |
| 5,739,602 | A | 4/1998 | Suzuki et al. |
| 5,760,944 | A * | 6/1998 | Minakuchi et al. ......... 359/211 |
| 5,769,544 | A | 6/1998 | Suzuki et al. |
| 5,786,594 | A | 7/1998 | Ito et al. |
| 5,838,024 | A | 11/1998 | Masuda et al. |
| 5,875,051 | A | 2/1999 | Suzuki et al. |
| 5,909,966 | A | 6/1999 | Suzuki et al. |
| 5,962,874 | A | 10/1999 | Masuda et al. |
| 5,969,844 | A | 10/1999 | Itami et al. |
| 5,986,791 | A | 11/1999 | Suzuki et al. |
| 6,069,724 | A | 5/2000 | Hayashi et al. |
| 6,081,386 | A | 6/2000 | Hayashi et al. |
| 6,104,522 | A | 8/2000 | Hayashi et al. |
| 6,141,133 | A | 10/2000 | Suzuki et al. |
| 6,150,779 | A | 11/2000 | Itami et al. |
| 6,188,086 | B1 | 2/2001 | Masuda et al. |
| 6,222,662 | B1 | 4/2001 | Suzuki et al. |
| 6,233,081 | B1 | 5/2001 | Suzuki et al. |
| 6,239,860 | B1 | 5/2001 | Ito |
| 6,256,133 | B1 | 7/2001 | Suzuki et al. |
| 6,281,609 | B1 | 8/2001 | Itami et al. |
| 6,330,017 | B1 | 12/2001 | Suzuki |
| 6,347,004 | B1 | 2/2002 | Suzuki et al. |
| 6,359,717 | B1 | 3/2002 | Suzuki et al. |
| 6,384,949 | B1 | 5/2002 | Suzuki |
| 6,388,792 | B1 | 5/2002 | Atsuumi et al. |
| 6,400,391 | B1 | 6/2002 | Suhara et al. |
| 6,417,509 | B1 | 7/2002 | Atsuumi et al. |
| 6,448,998 | B1 | 9/2002 | Suzuki et al. |
| 6,465,918 | B1 | 10/2002 | Itami et al. |
| 6,509,995 | B1 | 1/2003 | Suzuki et al. |
| 6,580,186 | B1 | 6/2003 | Suzuki et al. |
| 6,596,985 | B1 | 7/2003 | Sakai et al. |
| 6,606,179 | B1 | 8/2003 | Suzuki et al. |
| 6,657,761 | B1 | 12/2003 | Suzuki et al. |
| 6,697,181 | B1 | 2/2004 | Masuda |
| 6,744,545 | B1 | 6/2004 | Suhara et al. |
| 6,768,506 | B1 | 7/2004 | Hayashi et al. |
| 6,771,407 | B1 | 8/2004 | Hayashi et al. |
| 6,778,203 | B1 | 8/2004 | Itami et al. |
| 6,781,729 | B1 | 8/2004 | Suzuki et al. |
| 6,785,028 | B1 | 8/2004 | Atsuumi et al. |
| 6,788,444 | B1 | 9/2004 | Suzuki et al. |
| 6,791,729 | B1 | 9/2004 | Atsuumi et al. |
| 6,800,845 | B1 | 10/2004 | Sakai et al. |
| 6,801,351 | B1 | 10/2004 | Suzuki et al. |
| 2002/0080428 | A1 | 6/2002 | Suzuki et al. |

FOREIGN PATENT DOCUMENTS

| | | |
|---|---|---|
| JP | 9-325288 | 12/1997 |
| JP | 10-62705 | 3/1998 |
| JP | 10-235928 | 9/1998 |

* cited by examiner

OPTICAL SCANNING APPARATUS FOR ACCURATELY DETECTING AND CORRECTING POSITION OF OPTICAL BEAM IN SUBSCANNING DIRECTION, AND THE METHOD

BACKGROUND OF THE INVENTION

1. Field of the Invention

The present invention relates to an optical scanning apparatus used as an optical writing part of an image forming apparatus, and relates to an image forming apparatus and a color image forming apparatus including the optical scanning apparatus such as a laser printer, a digital compound machine, a laser facsimile, a laser plotter and the like.

2. Description of the Related Art

As an example of the optical writing part of the image forming apparatus, an optical scanning apparatus is known. The optical scanning apparatus includes a light source such as a semiconductor laser, an optical deflection part such as a polygon mirror, and a scanning optical system including a scanning lens and a mirror. In the optical scanning apparatus, an optical beam emitted from the light source is deflected by the optical deflection part, and the optical beam is concentrated on a scanned surface that is an image carrier via the scanning optical system so that the optical beam scans the scanned surface.

As to a color image forming apparatus, a tandem system is known. The color image forming apparatus of the tandem system includes a plurality of image carriers such as photosensitive drums arranged in parallel, and optical scanning apparatuses corresponding to each color. Each optical scanning apparatus scans the corresponding photosensitive drum by at least one optical beam corresponding to a color image signal so that a latent image is formed on each photosensitive drum. The latent images on each photosensitive drum are developed by toners of corresponding colors, so that toner images are superimposed with each other and are transferred to a transferring paper to obtain a color image. In the color image forming apparatus of the tandem system, image writing start positions of optical beams for each color should be the same. If the positions are shifted each other, displacements (shifts) of colors occur so that image quality deteriorates. Therefore, in the color image forming apparatus, a photodetector is provided in each optical scanning apparatus for detecting each optical beam at the scan start side. Thus, a time from a beam detecting time to a writing start time can be adjusted for each optical scanning apparatus so that the writing start positions can be aligned. That is, The adjustment of the writing start position is for the main scanning direction.

The above-mentioned color shifts may occur in the subscanning direction that is perpendicular to the main scanning direction. There are various causes for the color shifts in the subscanning direction. For example, the causes are a shift of an optical axis of the optical beam due to change of temperature, an eccentricity of the photosensitive drum and the like. Regardless of the causes, if a shift of an optical beam in the subscanning direction can be detected, the shift can be corrected by using a proper method.

Japanese laid-open patent application No. 10-235928 (document 1) discloses an example for solving the above-mentioned problem. The optical scanning apparatus in the Japanese laid-open patent application No. 10-235928 includes photodetectors each receiving a scan start optical beam as shown in FIGS. 2 and 4 of the document 1. By using the photodetector shaped as shown in FIG. 4, a shift amount in the subscanning direction can be calculated.

However, according to the photodetector of the document 1, there is a problem in that a time for a beam to pass through the photodetector cannot be detected accurately. For example, if a light amount of the optical beam changes, timing for detecting the beam by the photodetector may change.

In addition, according to the optical scanning apparatus of the document 1, the photodetectors are provided at one place that is an end of an image region. Thus, there is a problem in that the optical scanning apparatus cannot detect an inclination or a curve of the scanning line from the start to the end or in part of the scanning line, in which the inclination or the curve may occur when temperature varies in the main scanning direction or in the subscanning direction in each optical element. Thus, by the technique disclosed in the document 1, image quality deterioration due to the inclination or the curve of the scanning line cannot be corrected.

As mentioned above, the color image forming apparatus includes a plurality of optical scanning apparatuses. In each optical scanning apparatus, the semiconductor laser emits an optical beam. The optical beam is concentrated on the charged photosensitive drum via optical elements including the polygon mirror, lenses and the like, and the optical beam scans the photosensitive drum surface in the main scanning direction. Accordingly, image information is written into the rotating photosensitive drum by using optical beams having a predetermined pitch, and an electrostatic latent image corresponding to the image information is formed.

In the color image forming apparatus, temperature changes in each optical scanning apparatus due to heat generation by a polygon scanner and a fixing apparatus and the like. The change of the temperature may cause position shifts of lenses and the light source, cause change of a refractive index of an optical element and the like. Accordingly, optical characteristics in the optical scanning apparatus may change so that a position shift of an optical beam spot or a curve of the scanning line may occur on the scanned surface. As a result, relative positions of the scanning lines of each color are shifted so that the color shifts to deteriorate color image quality occur. The causes of the color shifts are not only the temperature change but also dimension errors in mechanical parts. In addition, there are various causes other than these causes.

As to the optical scanning apparatus, for increasing a speed for recording an image, it is necessary to rotate the polygon mirror at higher speed. However, the rotation speed of the polygon mirror is limited due to vibration and noise. Thus, instead of increasing the rotation speed of the polygon mirror, various methods have been proposed in which a plurality of lines are recorded at a time by using a plurality of optical beams.

The optical scanning apparatus adopting the method for using a plurality of optical beams at a time includes an light source unit including a semiconductor laser array (LDA) having multiple light-emitting points or a plurality of semiconductor lasers (LD) each having one light-emitting point. In the light source unit, a plurality of optical beams are integrated to form beam spots in the subscanning direction. The multiple optical beams emitted from the light source unit are deflected by the polygon mirror to scan a photosensitive drum so that multiple lines with a predetermined pitch are recorded at a time. However, although the light source unit is initially adjusted such that a predetermined subscanning direction pitch is obtained, the pitch is changed from the predetermined pitch due to external factors such as vibration, temperature and the like. Therefore, it is necessary to detect the shift of the subscanning direction pitch to correct it for obtaining a high quality image.

Some methods have been proposed for detecting and correcting the shift.

Japanese laid-open patent application No. 7-72399 (document 2) discloses an example of the method. In a system of the document 2, sensors are used for optical beam position detection in which sides of a scan start end of the sensors are not parallel to each other. In the system of the document 2, a time interval for passing through the start ends of the sensors are measured for each beam individually, and a difference between time intervals is converted to the subscanning direction pitch between beams. However, according to this method, detection positions may be changed due to power change of the optical beam or sensitivity change of the sensor caused by change of temperature or power source voltage. Thus, there is a problem in that the measured values of scanning positions or pitches vary.

Japanese laid-open patent application No. 9-325288 (document 3) discloses another example. In a scanning apparatus in document 3, a plurality of photosensors are arranged in a main scanning direction in which the photosensors include a photosensor that is parallel to the subscanning direction and a photosensor that is not parallel to the subscanning direction. The pitch is obtained by using time intervals of pulses generated when optical beams pass through the photosensors. In the method of document 3, output signals of the photosensors are added for detecting the beam positions. However, for performing such calculation, a circuit for detecting a 0 cross point in addition to the circuit for adding the signals is necessary. Therefore, there is a problem in that a large circuit size is necessary.

SUMMARY OF THE INVENTION

An object of the present invention is to provide an optical scanning apparatus for accurately detecting and correcting a position of an optical beam in the subscanning direction to correct an inclination or a curve of a scanning line. Another object of the present invention is to provide an optical scanning apparatus for accurately detecting and correcting a pitch of optical beams in the subscanning direction. Further object of the present invention is to provide an image forming apparatus and a color image forming apparatus including at least one optical scanning apparatus that can achieve the above-mentioned objects.

To achieve the above-mentioned objects, an optical scanning apparatus is provided in which the optical scanning apparatus including:

a light source emitting an optical beam;

an optical deflection unit deflecting the optical beam emitted from the light source;

a scanning optical arrangement scanning a scanned surface by the optical beam in a main scanning direction; and an optical beam detection unit detecting the optical beam moving in the main scanning direction, the optical beam detection unit including a first photodetector and a second photodetector, and the first photodetector including a first part and a second part that are electrically connected, wherein a first gap is formed between an edge of the first part and a first edge of the second photodetector, a second gap is formed between an edge of the second part and a second edge of the second photodetector, and the first gap and the second gap are not parallel to each other.

According to the present invention, the optical scanning apparatus can accurately detect and correct a position of an optical beam in the subscanning direction to correct an inclination or a curve of a scanning line. In addition, the optical scanning apparatus can accurately detect and correct a pitch of optical beams in the subscanning direction.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention are described with reference to figures.

First Embodiment

An optical scanning apparatus and a color image forming apparatus are described as a first embodiment of the present invention.

Figure 1:
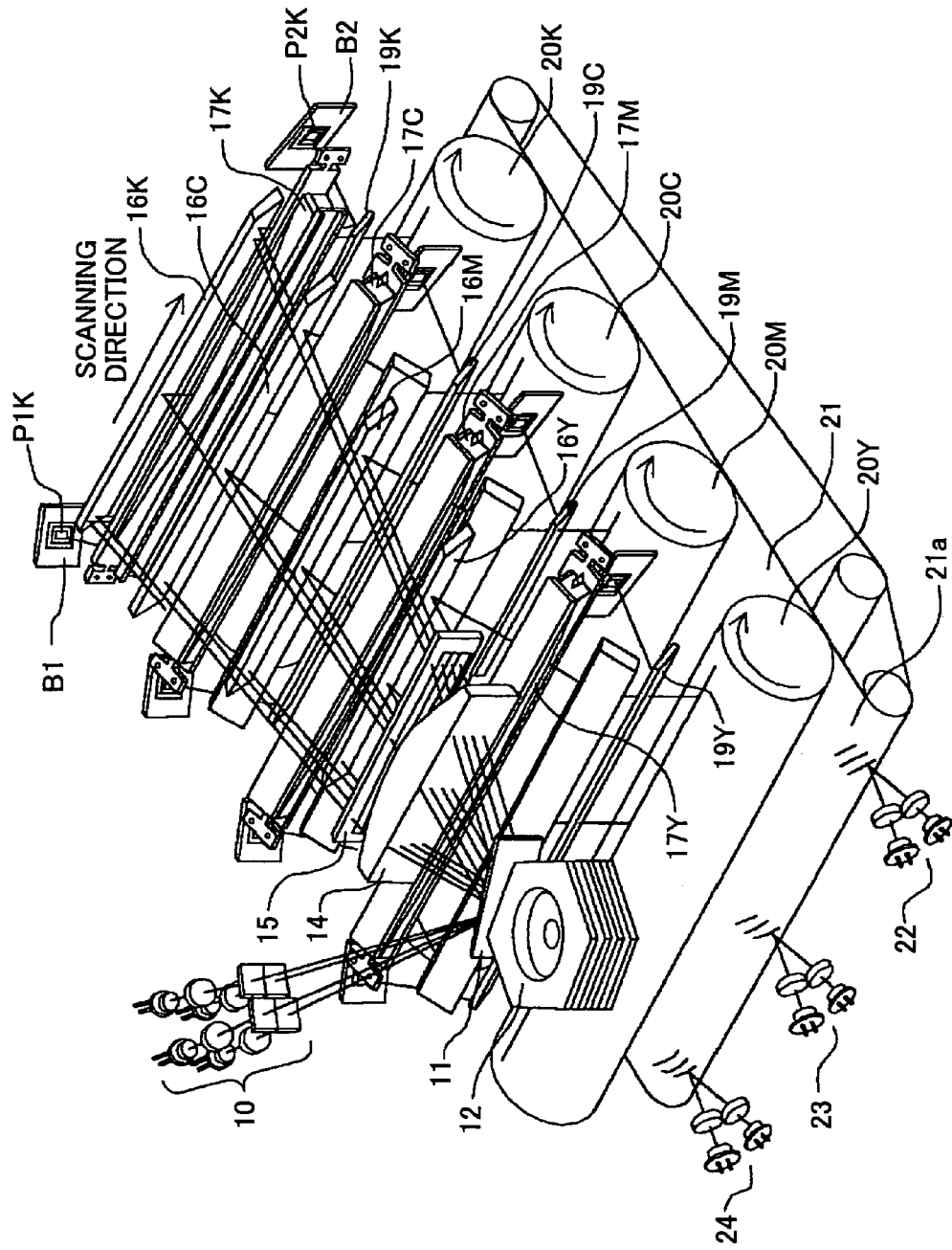
FIG. 1 shows an example of an optical scanning apparatus of a first embodiment.

FIG. 1 shows an example of the optical scanning apparatus of the first embodiment. The optical scanning apparatus is an example of a so-called tandem type. The optical scanning apparatus of the tandem type includes four scan imaging optical systems for four colors (yellow, magenta, cyan and black). In the optical scanning apparatus, each optical beam for each color modulated by an image signal of the color is concentrated on a corresponding photosensitive drum that is an image carrier for the corresponding color. The scan imaging optical system includes after-mentioned fθ lens group, mirrors (16) and half mirrors (19).

In FIG. 1, the symbol 10 indicates a light source. The light source 10 includes four light source devices each of which light source devices includes a semiconductor laser, a coupling lens and a cylindrical lens. A laser beam (to be referred to as an optical beam hereinafter) emitted from the semiconductor laser is converted into a beam form applicable to an optical system after the coupling lens. The optical beam is converted, for example, into a parallel beam or a weakly diffused or converged beam, and the beam is converged in the subscanning direction by cylindrical lens so that the optical beam is focused on near a deflecting reflection surface of the polygon mirror 12 as a line image that is long in the main scanning direction. Beam signals output from the four semiconductor lasers in the light source 10 are modulated by color component image information of yellow, magenta, cyan and black respectively, so that each semiconductor laser emits an optical beam for writing a corresponding color component image.

The polygon mirror 12 is provided with a polygon motor (not shown in the figure) that rotates the polygon mirror 12 at a constant high speed. By rotating the polygon mirror 12 at a high speed, the four optical beams corresponding to the four colors are deflected in the same direction. On the light path of the deflected four optical beams, a first lens 14 that forms the fθ lens group in the scan imaging optical system is provided, so that the deflected four optical beams pass through the first lens 14.

In FIG. 1, positions at which the deflected optical beams penetrate the first lens 14 are arranged in the order of black, cyan, magenta and yellow from the top. An optical beam for writing a black component image that passed through the first lens 14 is reflected by a mirror 16k that is provided on a path of the optical beam. The optical beam further passes through a second lens 17K that forms the fθ lens group so that the optical beam reaches a half mirror 19K. A part of the optical beam is reflected by the half mirror 19K, and the remaining part of the optical beam passes through the half mirror 19K. The beam that passed through the half mirror 19K focuses on a drum shaped photoconductive photosensitive body (referred to as photosensitive drum hereinafter) 20k as an optical spot, in which the photosensitive drum 20k forms a scanned surface. The optical beam scans the photosensitive drum 20k in a direction of the arrow shown in the figure, that is, in a direction parallel to the rotation center axis of the photosensitive drum 20k. The direction of scanning is called the main scanning direction. The photosensitive drum 20k rotates about the rotation center axis so that scanning in a direction perpendicular to the main scanning direction called subscanning direction is performed. The optical beam reflected on the half mirror 19K concentrates on an optical beam detector P1K or P2K for detecting the optical beam. The optical beam detector P1K is provided at a scan start side, and the optical beam detector P2K is provided at a scan end side. Each of the first lens 14 and the second lens 17K that form the f θ lens group is made of plastic by which it is easy to form an aspheric surface and the lens can be manufactured at low cost. More specifically, as the material of the lens, polycarbonate or synthetic resin that includes polycarbonate as a main component is suitable in which the polycarbonate has a low water absorbing property, high transparency and high moldability.

As mentioned above, as to the scanning optical system after the polygon mirror 12, although only a scanning optical system for writing the black component image has been described, each scanning optical system for cyan, magenta and yellow has substantially the same structure. That is, optical beams for writing a yellow component image, magenta component image and a cyan component image are respectively reflected on mirrors 16C, 16M and 16Y, pass through the second lenses 17C, 17M and 17Y, pass through half mirrors 19C, 19M and 19Y, and concentrate on photosensitive drums 20C, 20M and 20Y as optical spots respectively. Each optical beam scans the drum in the same direction indicated by the arrow. By scanning each photosensitive drum, an electrostatic latent image of a color component image corresponding to a scanning beam is formed on the photosensitive drum. Optical beam detectors same as the optical beam detectors P1K and P2K are provided in each scanning optical system of each color at a scan start side and at a scan end side.

The electrostatic latent image is visualized with a toner of a corresponding color by using a developing apparatus (not shown in the figure). Toner images of each color are transferred to an intermediate transferring belt 21. When the toner images are transferred, positions of the toner images of the colors are adjusted each other, and the images are superimposed so as to form a color image. The color image is transferred to a sheet recording medium (not shown in the figure) and fixed. After the color image is transferred, the intermediate transferring belt 21 is cleaned by a cleaning apparatus (not shown in the figure).

In this example, the above-described portion before the drums forms an optical scanning apparatus in which optical beams emitted from the light source devices are deflected by the polygon mirror 12. Each of the deflected beams is concentrated on a corresponding scanned surface via the first lens and the corresponding second lens 17. In the optical scanning apparatus, the optical beams deflected by the polygon mirror 12 are passed through the first lens 14. The optical scanning apparatus can be configured such that the light source apparatus emits more than one beams for each color. For example, two beams are used for each color. In this case, positions of the beams in the subscanning direction are different. Examples for using more than one beams will be described in the second embodiment in more detail.

In the following, functions of the optical beam detector is described taking a scanning optical system for black as an example.

Figure 2A:
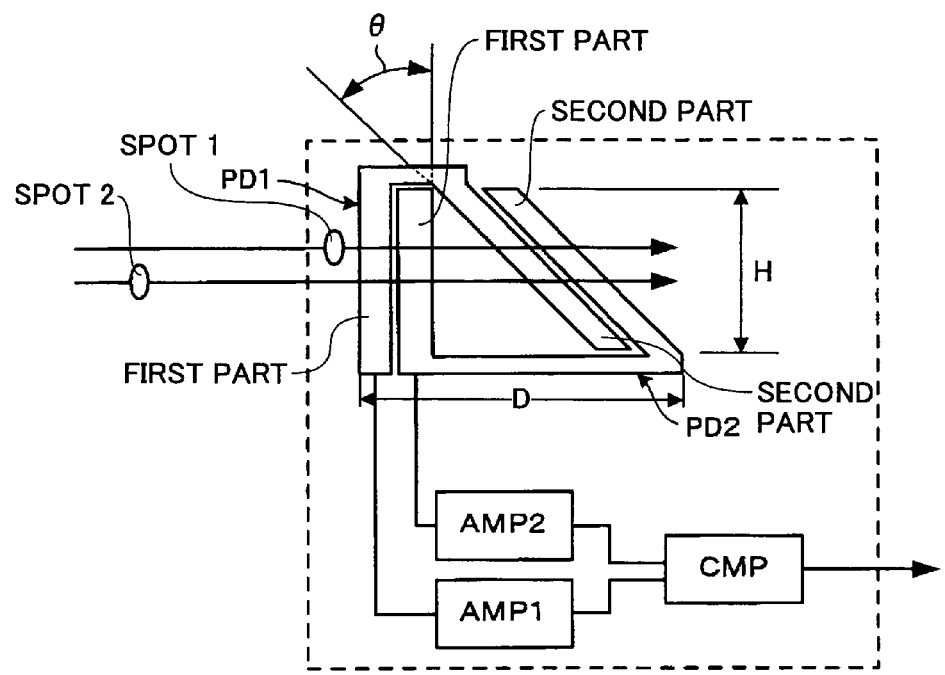
FIG. 2A shows a configuration of photodetection surfaces and a detection circuit of an optical beam detector.

A portion of the deflected optical beam separated by the half mirror is detected by the optical beam detector P1K provided at a scan start side in a scanning region, and is detected by the optical beam detector P2K provided at a scan end side. Each of the optical beam detectors are fixed on a substrate for fixing (B1, B2). FIG. 2A shows the optical beam detector in detail.

As shown in FIG. 2A, the optical beam detector includes two photodetectors PD1 and PD2. The surface of the photodetector PD1 is shaped like turning "V" upside down. As shown in the figure, the photodetector PD1 includes a first part and a second part that may detect a beam spot. Although the top part that is parallel to the main scanning direction is a part of the photodetector PD1 and can detect light, the top part is not included in either of the first part or the second part. The top part electrically connects the first part and the second part. The first part of the photodetector PD1 is perpendicular to the main scanning direction. The second part of the photodetector PD1 is inclined with respect to the subscanning direction. The angle between the first part and the second part is θ as shown in the figure. Although the first part and the second part are electrically connected by a photodetector material in this example, they may be connected by any conductive material.

The photodetector PD2 includes a first part and a second part that may detect a beam spot. Although the bottom part that is parallel to the main scanning direction is a part of the photodetector PD2 and can detect light, the bottom part is not included in either of the first part or the second part. The bottom part electrically connects the first part and the second part. The first part of the photodetector PD2 is perpendicular to the main scanning direction. The second part of the photodetector PD2 is inclined with respect to the subscanning direction. The angle between the first part and the second part is also θ as shown in the figure. Although the first part and the second part are electrically connected by a photodetector material in this example, they may be connected by any conductive material.

As shown in the figure, the first part of the photodetector PD1 is parallel to the first part of the photodetector PD2, and the second part of the photodetector PD1 is parallel to the second part of the photodetector PD2. The first part of the photodetector PD1 and the first part of the photodetector PD2 are slightly apart from each other, and the first part of the photodetector PD1 is placed in a scan start side with respect to the first part of the photodetector PD2. That is, a gap is formed between an edge of the first part of PD1 and an edge of the first part of PD2. The second part of the photodetector PD1 and the second part of the photodetector PD2 are slightly apart from each other, and the second part of the photodetector PD1 is placed in a scan start side with respect to the second part of the photodetector PD2. That is, a gap is formed between an edge of the second part of PD1 and an edge of the second part of PD2.

Although the optical beam detector can exhibit predetermined functions by setting the angel θ to satisfy a condition of 0<θ<90, it is preferable to set the angle to be within a range of 30°~60°. In the example shown in FIG. 2A, the angle is set to be 45° that is most preferable. If the angle is smaller than 30°, after-mentioned time difference between T1 and T2 becomes small so that detection sensitivity becomes worse. On the contrary, if the angle exceeds 60°, a detection height H in the subscanning direction compared to the whole width D of the photodetector surface in the main scanning direction becomes small. In this case, if the height H is increased for keeping a necessary height, the whole width D of the photodetector is increased, so that there occurs a problem in that the photodetector surface may overlap an image forming region or there occurs a problem in that it becomes necessary to widen an effective region of the scanning optical system so that the scanning lens becomes long. By setting the subscanning direction height H and the whole width D of the photodetector to be equal to or less than H=1~3 mm and D=5 mm respectively, the above-mentioned problems do not occur. It is most preferable to set the angle as θ=45° since the above-mentioned problems are overcome with good balance.

In FIG. 2A, a circuit block diagram of the optical beam detector is shown. The circuit includes two amplifiers AMP1 and AMP2, and a comparator CMP. In the circuit, the amplifier AMP1 amplifies a signal output from the photodetector PD1. The amplifier AMP2 amplifies a signal output from the photodetector PD2. In each of the amplifiers, current-voltage conversion and voltage amplification are performed for the output signal. After that, voltages output from the amplifiers are compared by the comparator CMP so that a signal is output when an output signal level of the amplifier AMP2 is lower than an output signal level of the amplifier AMP1.

In the example shown in FIG. 2A, two optical beams are used for each color. The optical beams are separated with a predetermined interval in the main scanning direction and in the subscanning direction indicated by "spot 1" and "spot 2" in the figure. The beam interval in the main scanning direction is set to be larger than D (that is a level of several mm as described later). The beam interval in the subscanning direction is appropriately set in accordance with recording density of the image. For example, when the recording density is 1200 dpi, the beam interval in the subscanning direction is about 21 µm. Therefore, the beam interval in the main scanning direction is much larger than the beam interval in the subscanning direction. The above-mentioned values are applied for scanning the optical beam detector.

Figure 2B:
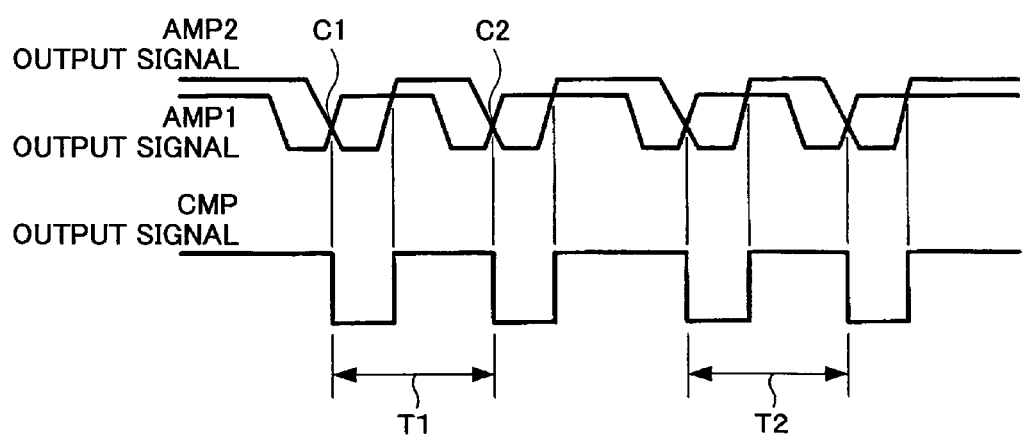
FIG. 2B shows a timing chart of the optical beam detector in FIG. 2A.

FIG. 2B shows a timing chart showing the output signals of the optical beam detector when the spots of two optical beams pass through the two photodetectors surfaces PD1 and PD2.

When the spot 1 reaches the edge of the first part of PD1, the output signal level of AMP1 starts to fall from the highest level. Then, while the spot 1 is passing through the first part of PD1, the output signal level of AMP1 is in a lowest level. While the spot 1 is exiting from the first part of PD1, the output signal level of AMP1 rises from the lowest level. Then, after the spot 1 exits from the first part of PD1, the output signal level of AMP1 returns to the highest level.

While the spot 1 is exiting from the first part of PD1, the spot 1 is entering the first part of PD2. Thus, the output signal level of AMP2 falls from the highest level. Therefore, while the spot 1 is exiting from the first part of PD1 (while the spot 1 is entering the first part of PD2), the output signal level of AMP1 and the output signal level of AMP2 cross each other as shown by "C1" in the figure.

In the same way, while the spot 1 is exiting from the second part of PD1 (while the spot 1 is entering the second part of PD2), the output signal level of AMP1 and the output signal level of AMP2 cross each other as shown by "C2" in the figure. The time interval between C1 and C2 indicates a time interval from a time when the spot 1 passes through a gap between the first parts of PD1 and PD2 to a time when the spot 1 passes through a gap between the second parts of PD1 and PD2. The time interval is indicated as "T1" in the figure. In the same way, a time interval for the spot 2 is indicated as "T2".

By using the cross points to detect the interval, variations of detection values due to changes of light amount of the optical beam or due to changes of temperature can be reduced, so that the subscanning direction position of the spot can be precisely detected.

Since the second parts of PD1 and PD2 are inclined, and the spot 1 and the spot 2 moves at the same speed, T2 is longer than T1. Generally, the time interval is in proportion to the position of the spot in the subscanning direction. If an optical beam crosses the upper side of the detector, the time interval becomes short. If the optical beam crosses the lower part of the detector, the time interval becomes long.

The interval length (ΔP, to be referred to as a pitch) between the spot 1 and the spot 2 in the subscanning direction can be calculated by the following equation:

$$\Delta P = v \times (T2-T1)/\tan \theta \quad (1)$$

wherein v indicates a speed of the spot. Since v and θ are substantially constants, the subscanning direction interval (pitch) may be corrected by using only (T2−T1). T2−T1 can be obtained by two optical beams reflected from one reflection surface of the polygon mirror (to be referred to as "first scan").

Figure 3A:
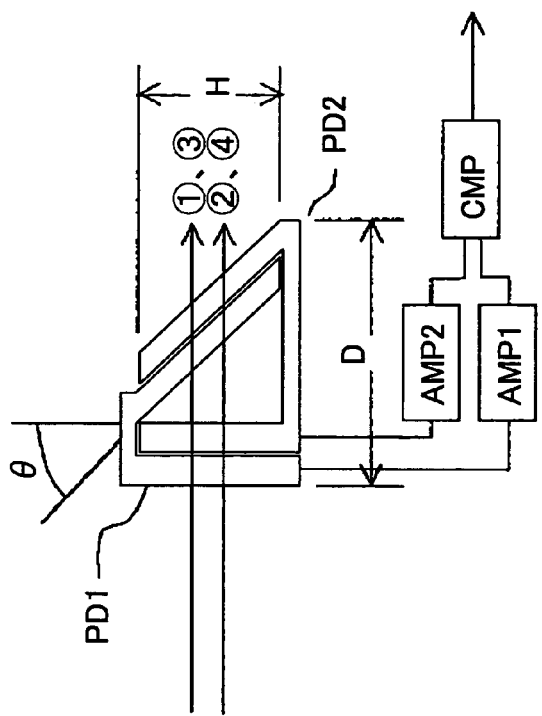
FIG. 3A shows a configuration of photodetection surfaces and a detection circuit of an optical beam detector.

The optical beam detector can also detect variation of the pitch or variation of a position of an optical beam in the subscanning direction. FIG. 3A shows a case where the first scan and a second scan are performed. In the figures, ① and ② correspond to beams in the first scan, and ③ and ④ correspond to beams in a second scan. In the figure, ① and ③ corresponds to beams of the same position in the subscanning direction, and ② and ④ corresponds to beams of the same position in the subscanning direction. In the figure, T1' indicates a time interval corresponding to the beam ③, and T2' indicates a time interval corresponding to the beam ④.

When the second scan is performed by a next reflection surface of the polygon mirror, if the optical beam includes an error component due to surface inclination of the polygon mirror or jitter, the passing position of the optical beam shifts from the passing position of the beam of the first scan in the subscanning direction. Thus, a second result T2'−T1' may differ from the first result T2−T1. Therefore, it is desirable to decrease influence from the scanning error component by averaging the first detection result T2−T1 and the second detection result T2'−T1' and further results after the second scan, and by comparing the average with a predetermined value and correcting the error by using the comparison result.

Figure 3B:
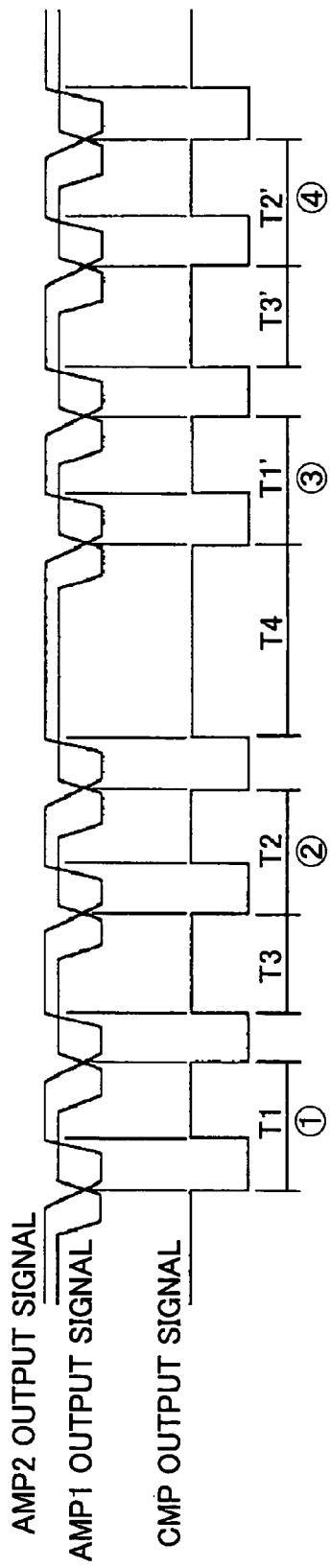
FIG. 3B shows a timing chart of the optical beam detector in FIG. 3A.

In the timing chart shown in FIG. 3B, T3 indicates a time interval from a time when the first optical beam passes through the photodetectors to a time when the second beam is detected by a gap between the first parts of PD1 and PD2. That is, since an error may occur if more than one beams enter the photodetectors at a time, the optical beam detector is designed such that the second beam starts to be detected after the signal levels of PD1 and PD2 enter a state in which any beam is not detected.

The optical beam detector can also detect variation of a position of an optical beam in the subscanning direction. For example, as for the spot 1 (①), variation of the subscanning direction position can be calculated by substituting (T2−T1) with (T1'−T1) in the equation (1). If there is no change in the pitch, the variation can be also obtained by substituting (T2−T1) with (T2'−T2). When the subscanning direction interval between optical beams may change due to temperature change in the light source part and the like, the influence may be decreased by averaging (T1'−T1) and (T2'−T2).

In addition, by detecting the time interval continuously for each beam and comparing the time interval with a predetermined value, variation of the time interval can be obtained. That is, a position shift of a beam in the subscanning direction can be obtained. In addition, time intervals obtained from a plurality of beams may be averaged and the obtained average value can be compared with the predetermined value. When a plurality of optical beam detectors are provided in the main scanning direction, by detecting the subscanning direction positions in each optical beam detector for an optical beam, an inclination or a curve of a scanning line formed by the optical beam can be obtained.

In FIG. 3B, T4 indicates a time interval from a time when the second beam passes through the photodetectors to a time when the beam of ③ is detected by the gap between the first parts of PD1 and PD2. T4 is substantially longer than T3. In the interval T4, calculation for data processing can be performed.

By using the optical beam detector, since the first parts of the PD1 and PD2 are perpendicular to the main scanning direction, a synchronization signal in the main scanning direction can be detected. More particularly, writing of the image is started when a predetermined time elapses after the signal of T1 (T1') is detected.

In the embodiment shown in the figure, although two optical beams are emitted in the optical scanning apparatus for one color, the present invention can be applied to an optical scanning apparatus in which more than two optical beams are emitted for one color. In the case where more than two optical beams are emitted, the calculation of the equation (1) needs to be performed a plurality of times. More particularly, one calculation is performed for each combination of two beams. For example, when three optical beams are used, the calculation is performed three times, and when four optical beams are used, the calculation is performed four times.

As mentioned above, by using the signals output from one optical beam detector, the interval between the optical beams in the subscanning direction can be detected. Also, a position of an optical beam can be detected. In addition, by using the first parts of the optical beam detector that are perpendicular to the main scanning direction, an optical beam that passes through the first parts can be detected so that a synchronization signal in the main scanning direction can be obtained.

By arranging two or more optical beam detectors in the main scanning direction for each scanning optical system of each color, an inclination or a curve of a scanning line can be precisely detected by detecting a subscanning direction position of a beam in each of the optical beam detectors. When there is large temperature distribution in the main scanning direction in optical elements in the system, there is a case where the interval between optical beams in the subscanning direction may vary in a scanning line. In such a case by providing multiple optical beam detectors in the main scanning direction, the change of the interval can be detected accurately. The detected information is fed back to a correction part so that the inclination or the curve or the interval change can be corrected so that high quality image can be obtained.

For the above-mentioned purpose, at least two optical beam detectors are provided at the both ends of the main scanning line of the image region. In a case where two optical beam detectors are provided in the outside of the image region on the main scanning line like the case shown in FIG. 1, it is not necessary to use an optical element for dividing light such as the half mirror for guiding a deflected optical beam to an optical beam detector. In this case, it is desirable to arrange a total reflection mirror in place of the half mirror. Describing more particularly with reference to FIG. 1, the half mirror 19K in one scanning optical system for black is replaced with a total reflection mirror, and other half mirrors in other scanning optical systems for other colors are replaced by total reflection mirror similarly. By replacing the half mirror with the total reflection mirror, there is a merit in that the light amount is not lost. Further, in addition to arranging the two optical beam detectors at the both ends of the image, it is desirable to arrange at least one additional optical beam detector within the image region by providing corresponding half mirror for guiding a part of an optical beam to the optical beam detector. By providing the additional optical beam detector, a complicated scanning line curve can be detected, and relative differences among curves corresponding to systems of each color can be detected.

In addition, the time interval T1 for an optical beam is detected, and the value is fed back to a frequency adjustment part of a driving clock of image information corresponding to each color, so that the frequency adjustment part adjusts the frequency such that a writing width becomes the same for each color.

A diameter (radius) of an optical beam that scans the optical beam detector is not necessarily the same as that scanning the image region. The diameter of the optical beam that scans the optical beam detector needs to be constant in the main scanning direction and in the subscanning direction, that is, the diameter needs to be constant regardless of change of temperature. That is, in the embodiment shown in the figure, since the detection signals are generated from the optical beam detector P1K of the scan start side and the optical beam detector P2K of the scan end side, detection error does not easily occur from the optical beam detectors in the configuration. Therefore, it is not necessary that the diameter of an optical beam that scans the optical beam detector provided in the outside of the image region is the same as that of an optical beam that scans an image region. The diameter of the optical beam that scans the optical beam detector may be larger than the diameter of optical beam that scans an image region. Therefore, since a desired optical beam diameter should be kept only for an optical beam for scanning the image region, the severity of the precision of optical elements at the end sides of the main scanning direction can be moderated so that the apparatus can be downsized and the cost for manufacturing the apparatus can be reduced.

If necessary light amount for the image region and necessary light amount for the optical beam detector are different, the output power of the light source may be adjusted only when the optical beam is detected by the optical beam detector, so that detection precision can be improved.

Figure 4A:
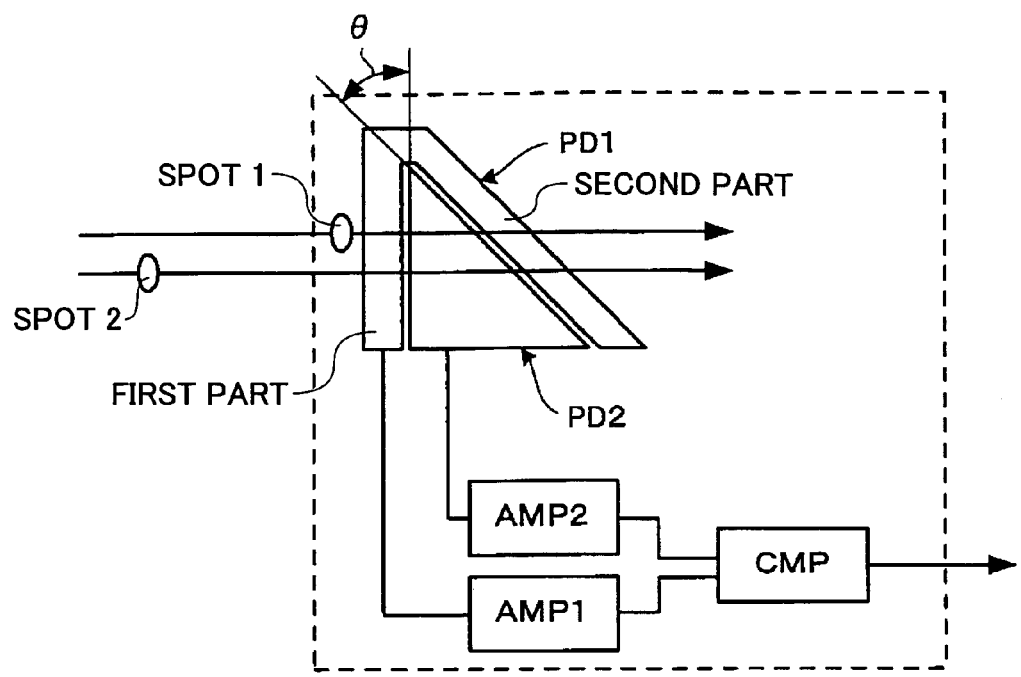
FIG. 4A shows another configuration of photodetection surfaces and a detection circuit of an optical beam detector.

FIG. 4A shows another example of the optical beam detector. This optical beam detector also includes two photodetectors PD1 and PD2. The shape of the photodetector PD1 is substantially the same as that of PD1 shown in FIG. 2A. The shape of the photodetector PD2 is an isosceles triangle in which two sides (edges) of the triangle are enclosed by the first part and the second part of PD1. The first part of PD1 is perpendicular to the main scanning direction, and the angle between the first part and the second part of PD1 is θ. As shown in the figure, a first side of PD2 is parallel to the first part of PD1, and the first side of PD2 and the first part of PD1 are slightly apart from each other so that a gap is formed. A second side of PD2 is parallel to the second part of PD1, and the second side of PD2 and the second part of PD1 are slightly apart from each other so that a gap is formed. The angle between the first side and the second side of PD2 is θ. Like the example of FIG. 2, the range of the angle θ is 0<θ<90°. It is preferable to set the angle θ within a range of 30°~60°. In the example shown in FIG. 4A, the angle θ is 45°.

Figure 4B:
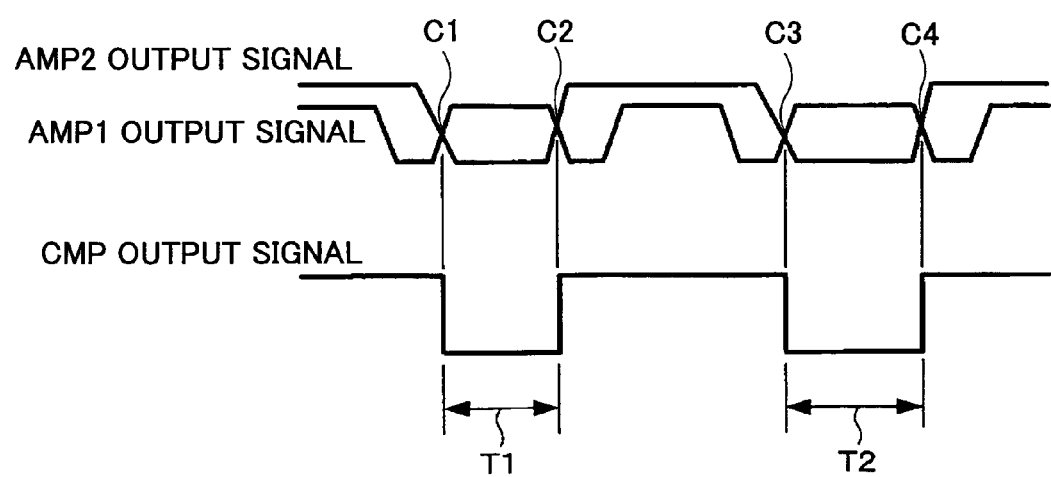
FIG. 4B shows a timing chart of the optical beam detector in FIG. 4A.
Figure 5A:
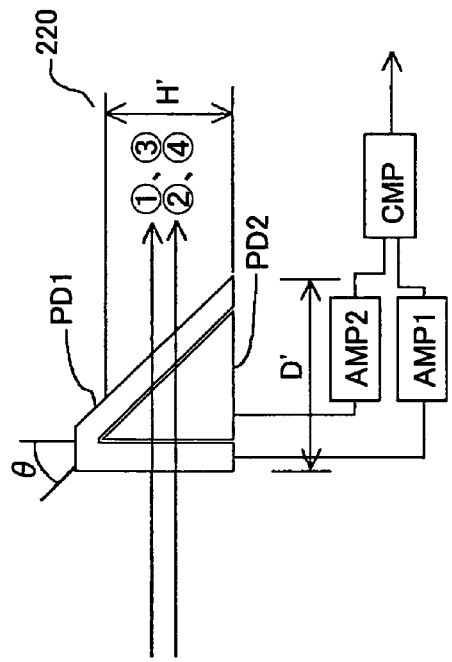
FIG. 5A shows a configuration of photodetection surfaces and a detection circuit of an optical beam detector.
Figure 5B:
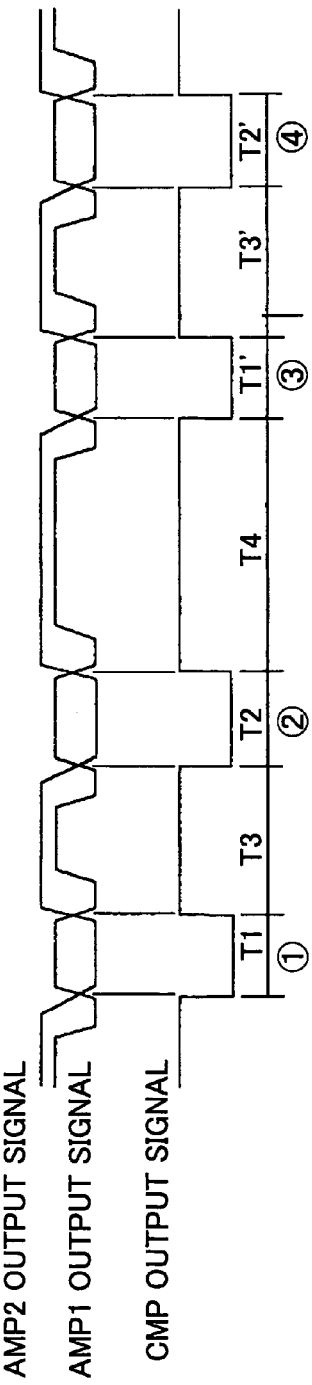
FIG. 5B shows a timing chart of the optical beam detector in FIG. 5A.

The photodetector PD1 is connected to an amplifier AMP1 and the photodetector PD2 is connected to an amplifier AMP2. And, a signal level of AMP1 is compared with a signal level of AMP2 by a comparator CMP in the same way as the optical beam detector shown in FIG. 2A. The principle for detecting an optical beam in this example is the same as that shown in FIGS. 2A and 2B. One pulse is output when an optical beam scans the optical beam detector. The pulse width (T1 or T2) is in proportion to a position of the optical beam on the optical beam detector in the subscanning direction. Also, the equation (1) can be used in this example. More particularly, at the cross point C1 in FIG. 4B, the spot 1 is passing through the gap between the first part of PD1 and the first side of PD2. At the cross point C2 in FIG. 4B, the spot 1 is passing through the gap between the second side of PD2 and the second side of PD1. C3 and C4 corresponds to the spot 2. FIGS. 5A and 5B are figures corresponding to the case shown in FIGS. 3A and 3B.

In the embodiment shown in FIG. 1, the substrates B1 and B2 for fixing the optical beam detectors P1K and P2K are separated. However, if the optical beam detectors operate under a temperature of no less than 50° C. or if temperature difference between any two of the optical beam detectors is no less than 5° C., it is preferable to provide one common substrate for fixing the optical beam detectors P1K and P2K. In the case, the fixing substrate is formed by a material having a coefficient of thermal expansion of no more than $1.0 \times 10^{-5}/°$ C. By forming the substrate by using the material, a bad influence due to temperature change can be substantially eliminated, in which the bad influence is that, for example, an accurate position of an optical beam position cannot be detected due to movement of the optical beam detector and relative position changes among the optical beam detectors. In a case where the optical beam detector is formed by photodiodes, it is preferable to use a nonconductive material as the fixing substrate to eliminate influences of electrical noises occurring among the multiple optical beam detectors. More particularly, it is preferable to use following materials for the substrate : glass (coefficient of thermal expansion $0.5 \times 10^{-5}/°$ C.), ceramics (alumina: coefficient of thermal expansion $0.7 \times 10^{-5}/°$ C., silicon carbide: coefficient of thermal expansion $0.4 \times 10^{-5}/°$ C.). By using aluminum alloy (coefficient of thermal expansion $2.4 \times 10^{-5}/°$ C.), optical beam detection accuracy deteriorates due to temperature change.

In FIG. 1, the symbol 11 indicates window glass provided in a housing that roughly hermetically encloses the polygon mirror 12 to prevent noise due to high speed rotation of the polygon mirror from leaking outside. Each optical beam from the light source 10 enters the polygon mirror 12 via the window glass 11, and the optical beam deflected by rotation of the polygon mirror 12 enters the lens 14 via the window glass.

In FIG. 1, each of the symbols 22, 23 and 24 indicates a detection part that forms a color shift detection mechanism for detecting color shifts on the intermediate transferring belt 21. Each of the detection parts 22, 23 and 24 includes a respective light source and a photodetector element. That is, each of the detection parts 22, 23 and,24 is configured such that an optical beam from a semiconductor laser that is the light source is concentrated by a condensing lens so that the optical beam irradiates a constant position on the intermediate transferring belt 21, and a reflected light from the intermediate transferring belt 21 is concentrated on the photodetector element by a lens, so that a predetermined pattern on the surface of the intermediate transferring belt 21 can be detected. For detecting the color shifts, a predetermined pattern used for detecting the shifts is written at three positions on each of the photosensitive drums 20K, 20C, 20N and 20Y via each scanning optical system by each optical beam, wherein the three positions are both ends and the center in the main scanning direction. Then, the patterns for each color are developed and visualized so that the patterns are transferred to the intermediate transferring belt 21. The patterns for the colors are formed on the intermediate transferring belt 21 such that the patterns are arranged at equal intervals in the subscanning direction. The pattern image is detected by each of the detection parts 22, 23 and 24. As a result of the detection, a curve of a scanning line (including inclination of the scanning line, and position shift of each scanning line) can be detected. By performing before-mentioned optical beam detection in the scanning optical system of each color and by performing detection of the toner patterns, a high quality image can be obtained by using a correction mechanism.

As shown in FIG. 1, a liquid crystal deflection element 15 that is a measure for correcting a scanning line is provided right after the lens 14. The liquid crystal deflection element 15 is provided in the light source side with respect to the lens (second lens 17K in FIG. 1) that has the power in the subscanning direction in the light path. By using the liquid crystal deflection element 15, a small-sized and reliable optical scanning apparatus can be obtained. The nearer the liquid crystal deflection element 15 is to the polygon mirror 12, the better the position of the liquid crystal deflection element 15 is. By providing the liquid crystal deflection element 15 in such a position, since the distance between the lens having the power in the subscanning direction and the liquid crystal deflection element 15 becomes large, the correction amount of the scanning line with respect to a deflection angle of the liquid crystal deflection element 15 becomes large.

Figure 6:
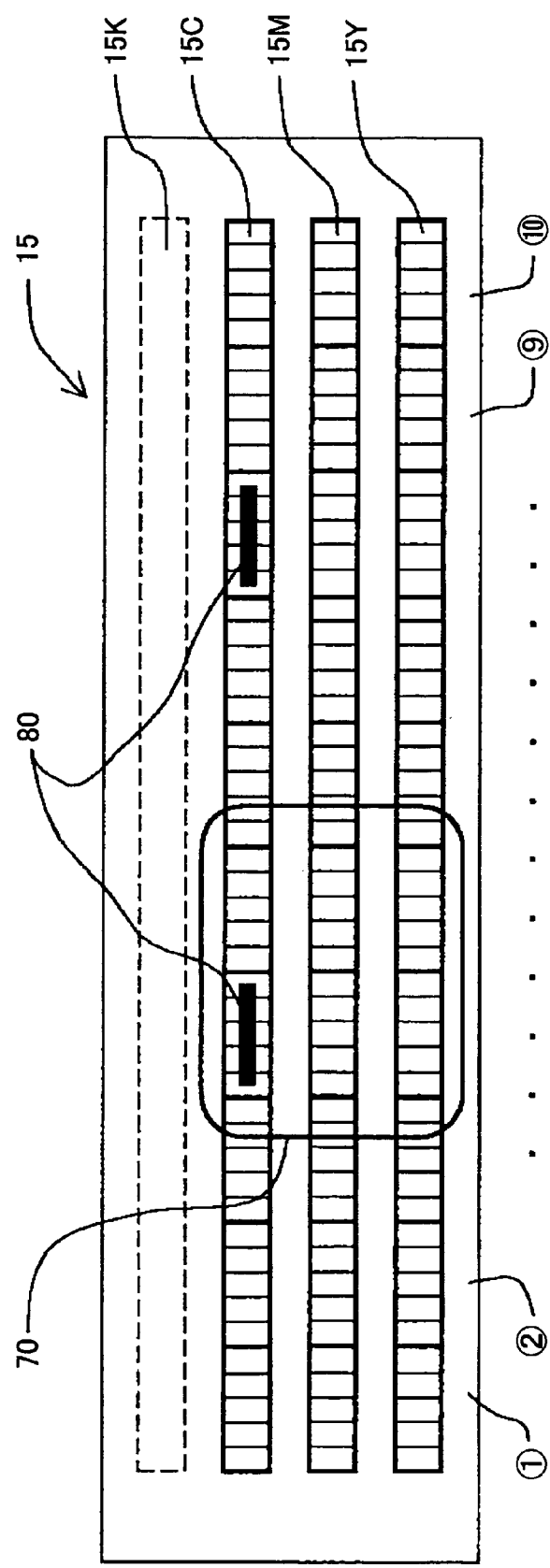
FIG. 6 shows an liquid crystal deflection element.
Figure 7:
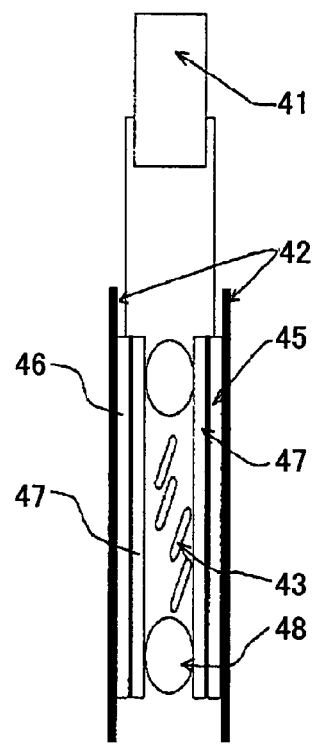
FIG. 7 shows a section of the liquid crystal deflection element.
Figure 8:
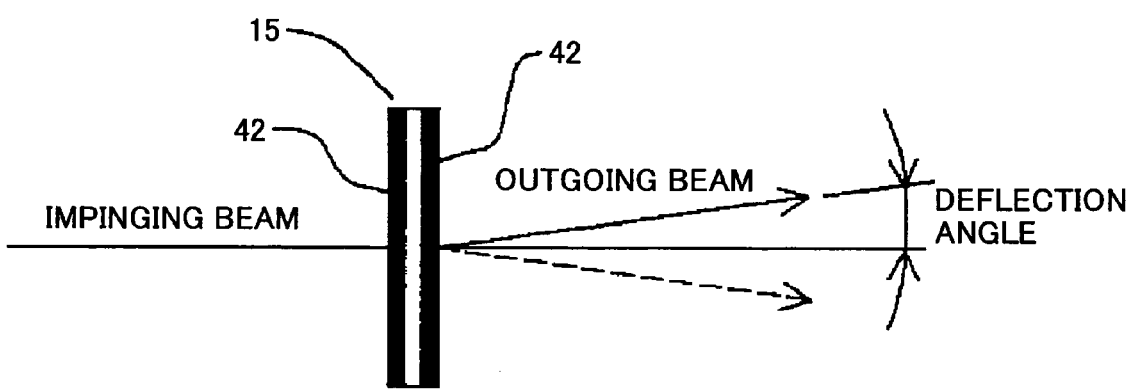
FIG. 8 shows a deflection method of the liquid crystal deflection element.

As shown in FIG. 6, the liquid crystal deflection element 15 includes four parts 15K, 15C, 15M and 15Y through which optical beams corresponding to black, cyan, magenta and yellow respectively pass through and are deflected respectively. The part indicated by the symbol 15K is transparent. In each of parts 15Y, 15M and 15C, two or more liquid crystal deflection parts shown in FIGS. 7 and 8 are provided in the main scanning direction. As shown in FIGS. 7 and 8, each of the liquid crystal deflection part in the liquid crystal deflection element 15 includes laser transparent members 42 (for example, resin of high transmission factor, glass and the like), a pair of transparent electrodes 45 and 46, and a pair of orientation films 47, spacers 48 and a liquid crystal layer 43. The laser transparent members 42 are arranged in parallel and opposed to each other. Each of transparent electrodes 45 and 46 is formed on the surface of the laser transparent member 42 at a side that is opposed to another laser transparent member 42. Each of the orientation films 47 is formed on the surface of the transparent electrode (45 or 46) at a side that is opposed to another transparent electrode. The spacers 48 are provided between the pair of the orientation films 47 for keeping a predetermine space between the orientation films 47. The liquid crystal layer 43 is formed by filling liquid crystal material in the space formed by the pair of orientation films 47 and the spacers 48.

In this embodiment, the liquid crystal deflection parts 15Y, 15M and 15C are integrated by the same laser transparent members, and ground electrodes and the liquid crystal layer 43 are commonly configured. One of the transparent electrodes 45 and 46 is the ground electrode. A voltage is applied to the transparent electrodes 45 and 46 from a driving circuit 41, and the voltage is controlled on the basis of detection results of the before mentioned scanning line curve or a beam position shift or an interval change. By controlling the applying voltage, as shown in FIG. 8, the output beam can be deflected so that the outgoing angle can be controlled. The liquid crystal deflection element 15 and the driving circuit 41 forms a scanning position correction part. The driving circuit 41 may be provided near the driving circuit 41 or may be provided outside of the optical scanning apparatus shown in FIG. 1.

Since the liquid crystal deflection element 15 is formed as mentioned above, a beam for writing black component image is passed through the transparent part 15K, and beams for writing images of colors of yellow, magenta and cyan are passed through the liquid crystal deflection parts 15Y, 15M and 15C respectively in which each of the liquid crystal deflection parts 15Y, 15M and 15C performs correction of the scanning line curve or beam position shift. More specifically, with reference to the curve of the scanning line of the beam for writing the black component image, each of the scanning lines of beams for yellow, magenta and cyan is corrected such that each of the scanning lines agrees with the curve of the scanning line for black. The amount of correction for the scanning line is calculated and set by a controller that may be provided in an image forming apparatus.

In the embodiment shown in FIG. 1, the first lens 14 is arranged on a light path that is common for optical beams for each color, and the scanning line correction part by using the liquid crystal element 15 is arranged after the first lens 14. By adopting such configuration, the liquid crystal element 15 can be configured such that scanning correction parts for each color can be integrated so that a simple configuration can be realized. It is possible that the part for black also includes the liquid crystal layer for correcting the scanning line. However, in such a case, since electrodes for driving the part for black is necessary and the driving circuit is necessary, power consumption may increase and the cost may rise. The first lens 14 has a power in the main scanning direction and does not have any power in the subscanning direction. The second lens 17K has a power in the main scanning direction smaller than the power of the first lens 14 and has a power in the subscanning direction. It is preferable that the liquid crystal deflection element 15 is arranged before the lens that has a power in the subscanning direction. As shown in the example of FIG. 1, most preferable position of the liquid crystal deflection element 15 is a position before the mirror 16k and right after the lens 14. In addition, by arranging the liquid crystal deflection element 15 close to the light source side as much as possible, it becomes possible to reduce the whole length of the liquid crystal deflection element 15 in the main scanning direction so that its yield is improved and the cost can be reduced.

The liquid crystal deflection element 15 is described further in detail in the following. Each of the transparent part 15K and the liquid crystal deflection parts 15Y, 15M and 15C is formed such that the main scanning direction side width is longer (horizontally oriented). The length of the part in the main scanning direction is set to cover at least the image region. The length of the part in the subscanning direction is set to cover at least a width of beams in the subscanning direction. The width of the liquid crystal layer in the subscanning direction is designed to be more than 2 mm wider than the width of the incoming optical beams in the subscanning direction in consideration of vignetting of the optical beams due to placement variations of elements and due to variations of element sizes.

Figure 9:
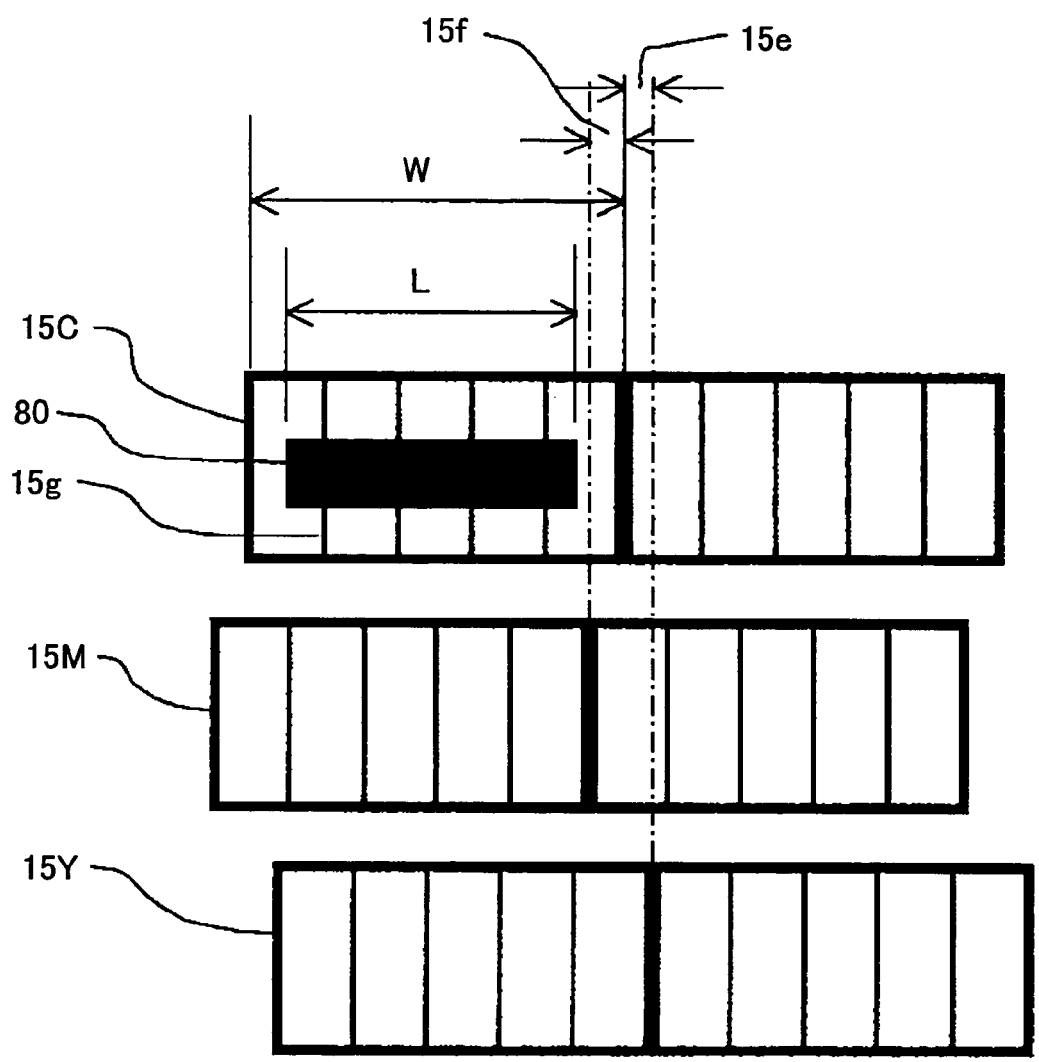
FIG. 9 shows an enlarged view of a part circled by a frame 70 shown in FIG. 6.

Each of the liquid crystal parts 15Y, 15M and 15C is divided into a plurality of driving sections (the width is W) in the main scanning direction. In the example of FIG. 6, as indicated by ①–⑩, the part is equally divided into ten sections. Each section of the liquid crystal layer is driven so that correction of the scanning line or beam position shifts is performed. The number for dividing is properly determined on the basis of the characteristics of lenses. Further, each section is equally divided to a plurality of subsections. FIG. 9 shows an enlarged view of a part circled by a frame 70 shown in FIG. 6. In the example shown in FIGS. 6 and 9, one driving section is divided into five subsections. Vertical lines in FIG. 9 indicate lines for dividing the section. Wide vertical line indicates a break between two sections. By diving a section into a plurality of subsections, there exist divided border parts (non-deflection parts) in addition to the driving border parts (border between sections) so that bad influences such as deterioration of profile of optical beams at the borders can be reduced.

In FIGS. 6 and 9, the symbol 80 indicates a section of an optical beam entering the liquid crystal deflection element 15. The section 80 of the optical beam is linear in the main scanning direction due to effects of the cylindrical lens in the light source part. Thus, the width W of the driving section is set to be wider than the width L of the optical beam in the main scanning direction. If the width W is narrower than the width L, the optical beam is always separated in the sub-scanning direction when the optical beam is deflected by the liquid crystal deflection element 15 so that it is inevitable that the optical beam may deteriorate. In this example, a plurality of subsections are included in the width L of the optical beam, and a border width (width of non-deflection part that does not include liquid crystal layer) between subsections that is shown as a vertical line 15g in FIG. 9 is set to be no more than $1/50$ of the width L of the incoming optical beam, and total widths of all border lines are set to be no more than $1/10$ of the width L of the incoming optical beam.

In the example shown in FIG. 6, when the incoming optical beam width is 10 mm, the width of the border line is 0.2 mm (therefore, 0.2 mm/10 mm=$1/50$), and the incoming optical beam covers four border line widths (0.2 mm×$4/10$ mm=$1/12.5$). If the border line widths exceed the above-mentioned value, the profile of the optical beam that is deflected by the liquid crystal deflection element 15 deteriorates, so that there occurs problems, for example, that the radius of the optical spot on the photosensitive drum increases.

Further as shown in FIG. 9, positions of the non-deflection parts (border lines between subsections) of the liquid crystal deflection parts 15Y, 15M and 15C are shifted each other in the main scanning direction such that the positions of the border lines between any two of the liquid crystal deflection parts 15Y, 15M and 15C are not aligned in the subscanning direction. In FIG. 9, the symbol 15f shows a shift amount of the non-deflection parts between the liquid crystal deflection parts 15C and 15M, and the symbol 15e shows a shift amount of the non-deflection parts between the liquid crystal deflection parts 15M and 15Y. If the non-deflection parts are not shifted as mentioned above, each of scanning lines of each color is divided at the same position if a deflection correction angle is large, so that there is a case where there appears a line at a corresponding position in the main scanning direction when an image is formed. Thus, as mentioned above, by shifting the sections among the colors, the divided points in the scanning line are not substantially shown so that the above-mentioned problem is reduced. The amount for shifting the driving section is at least no less than a radius ($1/e^2$) of the optical spot irradiated on the photosensitive drum. More particularly, in consideration of variations, it is preferable to set the shift amount to be no less than 50 μm. The upper limit of the shift amount is $1/2$ of the division width. If the shift amount is the same as the division width, the border parts aligns again. For shifting the driving sections, it is preferable to use. wiring patterns. By using wiring patterns, a stable shift amount can be obtained for mass production so that variations of quality can be reduced.

The deflection angle by the liquid crystal deflection part can be freely changed by changing a wave height of the driving voltage waveform or pulse width duty. The deflection angle is set in the following way. First, when a start signal for outputting an image is input, the optical beam detectors P1K and P2K detect scanning positions of an optical beam that passes through a scanning line reference color part (black) 15K in the liquid crystal deflection element 15. The scanning position is also detected for each of other colors. On the basis of the detection results, if the difference of the positions between the reference color and a target color in the subscanning direction is less than a desired value, the liquid crystal layers 15C, 15M and 15Y are not driven. If the value is equal to or more than the value, one or more of the liquid crystal layers 15C, 15M and 15Y are driven so that the deflection amount is controlled and the scanning position is corrected.

Instead of using the liquid crystal element 15, other mechanisms can be used for correcting the deflection angle by feeding back the results obtained from the optical beam detectors. For example, an attitude-control mechanism can be used. The attitude-control mechanism is arranged on the light path from the light source to the scanned surface for correcting and controlling an attitude of at least one optical element (such as scanning lens, mirror and the like). The attitude-control mechanism controls the attitude of at least one optical element according to position signals in the subscanning direction obtained from the optical beam detectors. By adopting the attitude-control mechanism, the interval between optical beams in the subscanning direction or a scanning position of an optical beam can be corrected. In other words, the attitude control mechanism functions as a scanning position correction part or a correction part for correcting the interval between optical beams in the subscanning direction.

The scan imaging parts including the first lens 14 and the second lens 17K and the like is contained in one housing (not shown in the figure) and is fixed in the housing. In the housing, a plurality of beams are deflected by the polygon mirror 12 and the deflected beams are passed through the scan imaging parts to reach the scanned surface. Thus, subscanning direction positions for each color can be detected accurately and the interval of optical beams in the subscanning direction can be detected accurately, so that writing positions for each color are not shifted, and a small-sized and low-cost optical scanning apparatus can be obtained.

By using the optical scanning apparatus shown in FIG. 1, a color image forming apparatus can be provided. The color image forming apparatus includes the optical scanning apparatus and image carriers scanned by optical beams and on which latent images are formed, a developing part for developing the latent images by using toner, and a transferring part for forming a color image by superimposing the toner images of the image carriers. More particularly, optical beams that are modulated by image signals of black, cyan, magenta and yellow scan photosensitive drums 20K, 20C, 20M and 20Y respectively, so that electrostatic latent images corresponding to the image signals are formed on each photosensitive drum. A toner of a corresponding color is supplied from the developing part corresponding to the color so that each of the electrostatic latent images is visualized. The toner images corresponding to each color formed on the photosensitive drums 20K, 20C, 20M and 20Y are adjusted and superimposed and transferred to the transferring belt 21, so that a color image is formed on the transferring belt 21. The color image is transferred to a sheet transferring medium such as a transferring paper, and is fixed by a fixing part and is ejected to the outside. After transferring the images, each of the photosensitive drums 20K, 20C, 20M and 20Y and the transferring belt 21 is cleaned. Each surface of the photosensitive drums 20K, 20C, 20M and 20Y is electrically charged evenly by a charging part for next image forming.

Second Embodiment

In the following, a second embodiment of the present invention is described.

Figure 10:
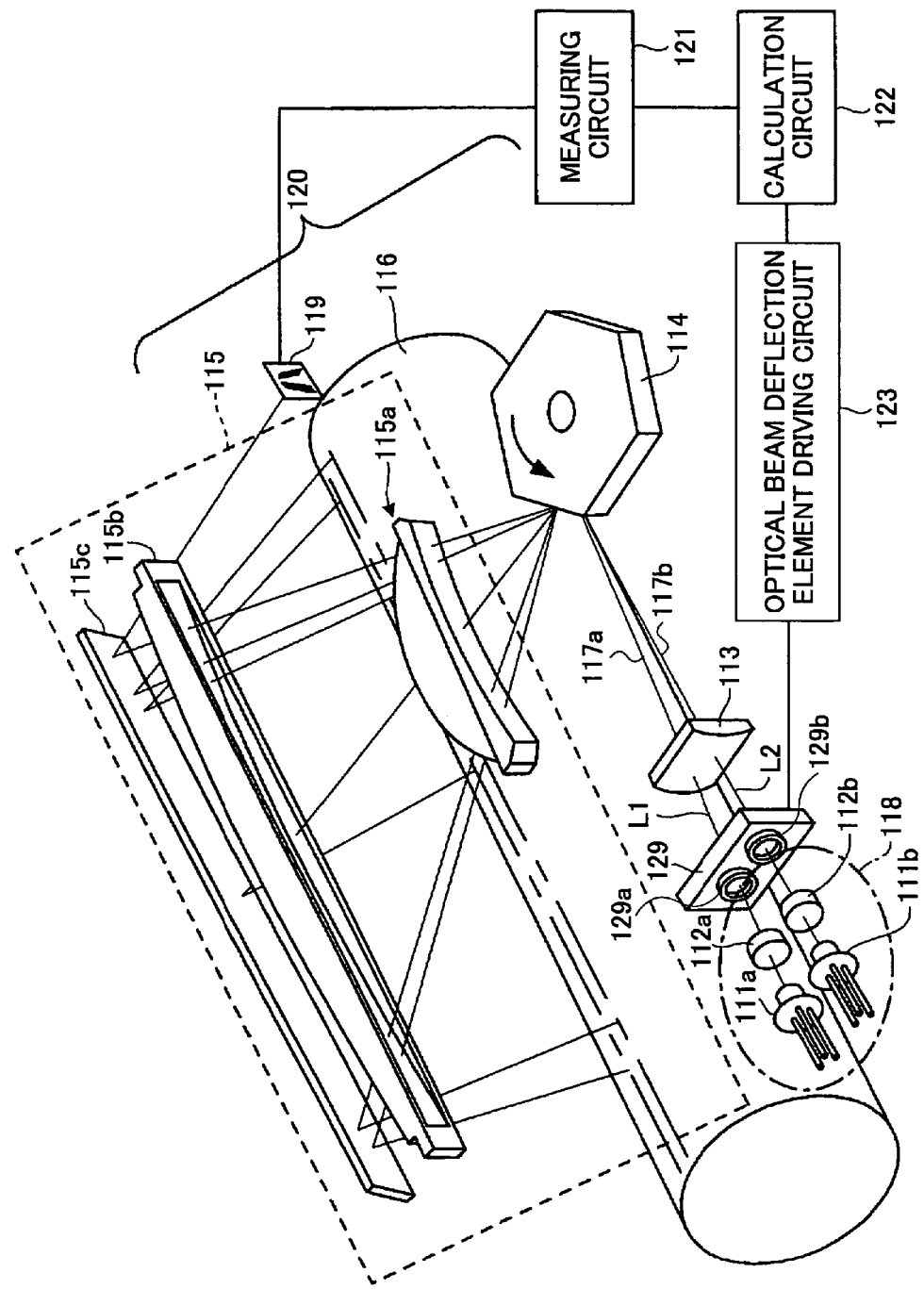
FIG. 10 is a block diagram of an optical scanning apparatus in a second embodiment.

FIG. 10 is a block diagram of an optical scanning apparatus in this embodiment. FIG. 10 shows an optical arrangement in the optical scanning apparatus in which one or more optical beam is used. In the figure, 111a and 111b indicate semiconductor lasers (LD) that are examples of light sources, 112a and 112b indicate coupling lenses, 113 indicates a cylindrical lens, and 114 indicates a polygon mirror (deflector) that is an example of an optical deflection part, 115 indicates an optical scanning system (scanning lenses 115a and 115b and a reflecting mirror 115c), 116 indicates a photosensitive drum (scanned surface) that is an example of an image carrier, 118 indicates a light source device, 119 indicates an optical beam detector (synchronization/sub-scanning position detection sensor : synchronization detection plate), 120 indicates the optical scanning apparatus, 121 indicates a measuring circuit, 122 indicates a calculation circuit, 123 indicates a beam deflection element driving circuit 123 that is used as a scanning position control part or a beam pitch control part, and 129 indicates an optical beam deflection element.

Although FIG. 10 shows an example in which two optical beams scans the scanned surface at the same time, the number of the beams is not limited as two. More than two beams can be used at the same time. In addition, only one beam can be used.

In FIG. 10, each of two optical beams 117a and 117b output from the two semiconductor lasers (LD) 111a and 111b in the light source device 118 impinges on a deflecting reflection surface of the polygon mirror 114 as a line image lengthening in the main scanning direction (the optical beam is focused on the surface in the subscanning direction). After that, the optical beam is reflected from the deflecting reflection surface of the polygon mirror 114, and is concentrated by the scanning optical system 115 so that the optical beam scans the scanned surface 116 (photosensitive drum) as a beam spot.

The apparatus by which the optical beam emitted from the light source device 118 scans the scanned surface 116 as a beam spot is called the optical scanning apparatus 120.

Although the light source device 118 in FIG. 10 includes the semiconductor lasers 111a and 111b and the coupling lenses 112a and 112b, the configuration of the light source device 118 is not limited to one shown in FIG. 10.

When the optical scanning apparatus 120 shown in FIG. 10 is used as an optical writing apparatus in an image forming apparatus, each of the optical beams emitted from the semiconductor lasers 111a and 111b is modulated by output image data. An electrical signal (synchronization signal) used for obtaining a modulation start timing is obtained by the optical beam detector (synchronization detection plate) 119 on which an optical beam impinges.

The two optical beams L1 and L2 that impinge on the polygon mirror 114 are not parallel to each other in a main scanning direction.

By adopting the above-mentioned configuration, an interval PY between two beam spots on the scanned surface 116 can be kept. Therefore, the synchronization detection signal for setting the modulation start timing can be detected for each of the two optical beams independently by using one synchronization detection plate 119.

Figure 11:
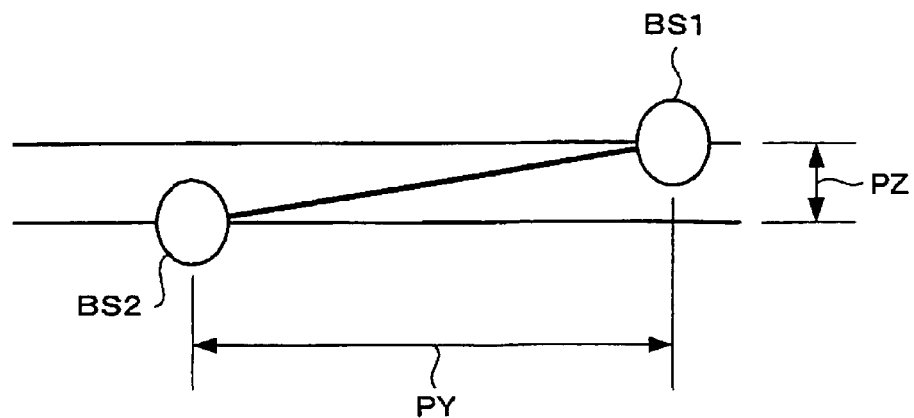
FIG. 11 shows intervals PY and PZ.

As shown in FIG. 11, a predetermined interval (beam pitch:PZ) between the two beams BS1 and BS2 in the subscanning direction should be kept according to a scanning density on the scanned surface 116.

Due to influences of changes of environment (temperature/humidity) and due to influences of time passing, the beam pitch:PZ may be changed. Therefore, the light source device 118 includes the optical beam deflection element 129. In addition, a sensor for detecting the pitch is provided in the optical beam detector (synchronization detection plate), so that an after-mentioned beam position detection circuit detects a beam position, and the beam pitch PZ is measured and a shift from a predetermined pitch is calculated by the circuits 121 and 122. If there is a shift (difference) from the predetermined pitch, the beam deflection element driving circuit 123 drives the optical beam deflection element 129 to deflect at least one beam to correct the pitch.

Figure 12:
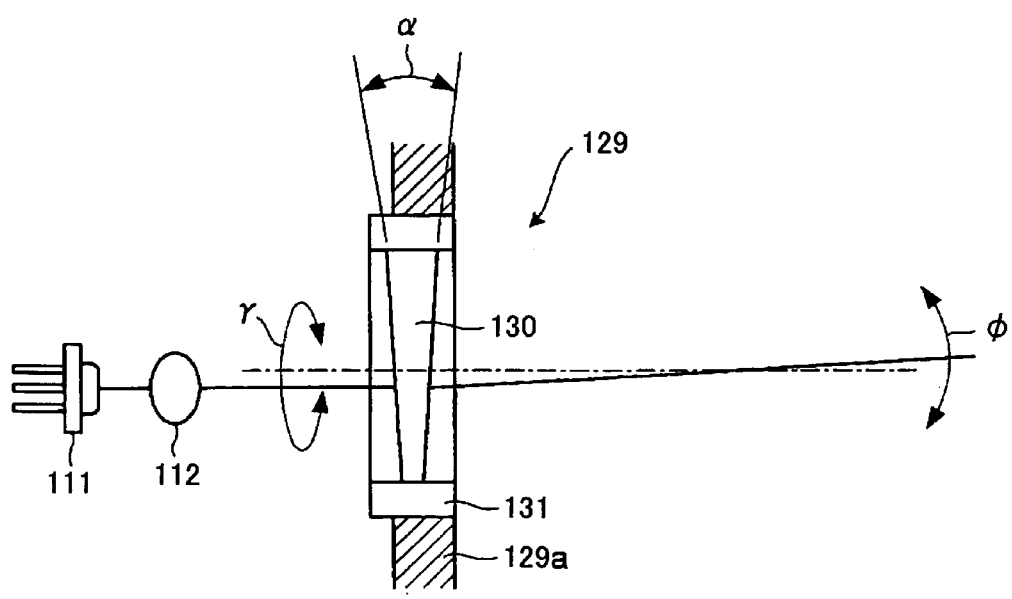
FIG. 12 shows an example in which an optical beam is deflected by using a wedge-shaped prism as the optical beam deflection element.

In the following, an example is described in which a wedge-shaped prism is used as the optical beam deflection element 129. FIG. 12 shows an example in which an optical beam is deflected by using the wedge-shaped prism as the optical beam deflection element 129. In the example, a wedge-shaped prism 130 having an apical angle α and a ring ultrasonic motor 131 are attached to a holding member 129a, and the wedge-shaped prism 130 is rotated by an angle γ by using the ring ultrasonic motor 131. Depending on the rotation angle, the optical beam changes by Φ with respect to the light axis. The optical beam deflection element 129 is not limited to the wedge-shaped prism 130. For example, the beam can be deflected by using a liquid crystal element driven by an electrical signal arranged on a light path of the optical beam as described in the first embodiment.

The structure and the operation of the optical beam detector used in this embodiment are the same as those of the first embodiment as shown in FIGS. 2A–5B. That is, the pitch can be obtained by using the equation (1).

As mentioned before, each of the first parts of the two photodetectors PD1 and PD2 are perpendicular to the main scanning direction. A signal detected by the first parts can be also used as a main scanning synchronization signal that indicates an image recording start position in the main scanning direction. However, it is not necessary to arrange the first parts to be perpendicular to the main scanning direction. In the case where the first parts are not perpendicular to the main scanning direction, since the angle between the first part and the second part can be increased, the detection sensitivity for detecting the subscanning direction position can be improved.

In the examples, by setting the gap interval between the first part of PD1 and the first part of PD2 to be smaller than a beam spot radius and by setting the gap interval between the second part of PD1 and the second part of PD2 to be smaller than the beam spot radius, since beam detection performed by the photodetector PD2 starts before beam detection by the photodetector PD1 ends, the output signals of the amplifier AMP1 and the amplifier AMP2 can be crossed with reliability.

Further, in the example, the signal level of the amplifier AMP2 is set to be higher than the signal level of the amplifier AMP1 when any beam is not detected. By using such signal levels, an error signal is not output even when noise is included in the signal so that high noise immunity can be obtained.

Figure 13:
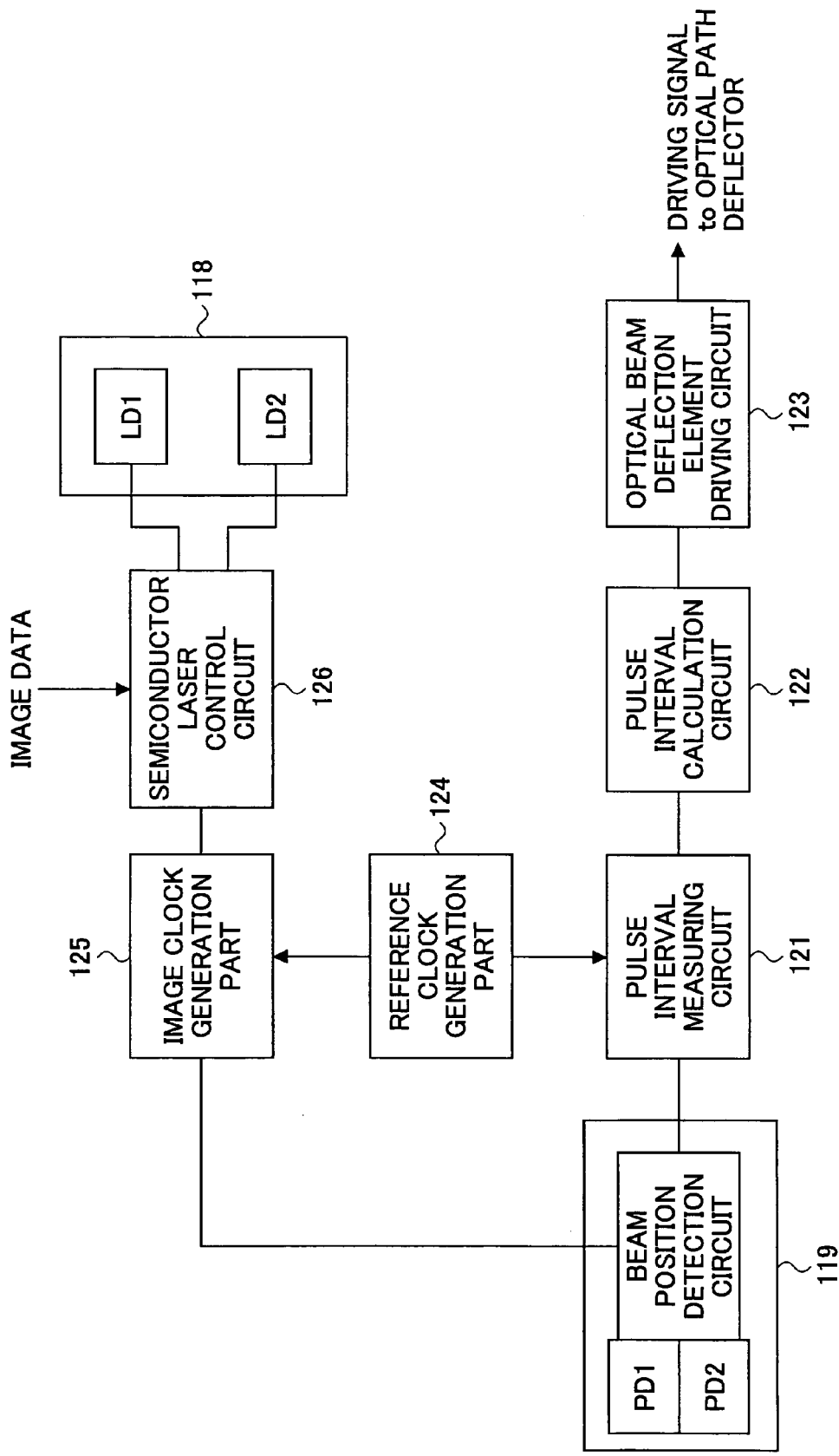
FIG. 13 shows a block diagram of an example of a control system for controlling the subscanning beam pitch.

FIG. 13 shows a block diagram of an example of a control system for controlling the subscanning beam pitch when the optical beam detector of the present invention is used.

In FIG. 13, 124 indicates a reference clock generation part, 125 indicates an image clock generation part, 126 indicates a semiconductor laser control circuit that controls light emission of the semiconductor lasers LD1 and LD2 according to image data.

Based on the beam position detection signals output from the beam position detection circuit (AMP1, AMP2, CMP) in the optical beam detector 119, the pulse interval measuring circuit 121 measures a time interval of a pulse generated when an optical beam passes through the two gaps between PD1 and PD2 by using a measurement clock generated from the reference clock generation part 124. The pulse interval corresponds to a time interval from a time when a spot formed by the optical beam passes through the first gap to a time when the spot passes through the second gap. The pulse interval measured in the pulse interval measurement circuit 121 is compared with a predetermined pulse interval by the pulse interval calculation circuit 122. If the measured pulse interval is different from a predetermined pulse interval by more than a predetermined value, the beam deflection element driving circuit 123 generates a driving signal that is applied to the optical beam deflection element 129 shown in FIG. 12, so that the wedge-shaped prism 130 is rotated by the ring ultrasonic motor 130 in the optical beam deflection element 129 such that the difference is corrected. For correcting only one beam, one wedge-shaped prism corresponding to the beam is corrected. For correcting two of the beams, two wedge-shaped prisms are corrected. In the above description, the difference between the measured pulse interval and the predetermined one corresponds to a position shift of a spot of a beam. The circuit 122 may actually calculate the position shift based on the difference.

Figure 14:
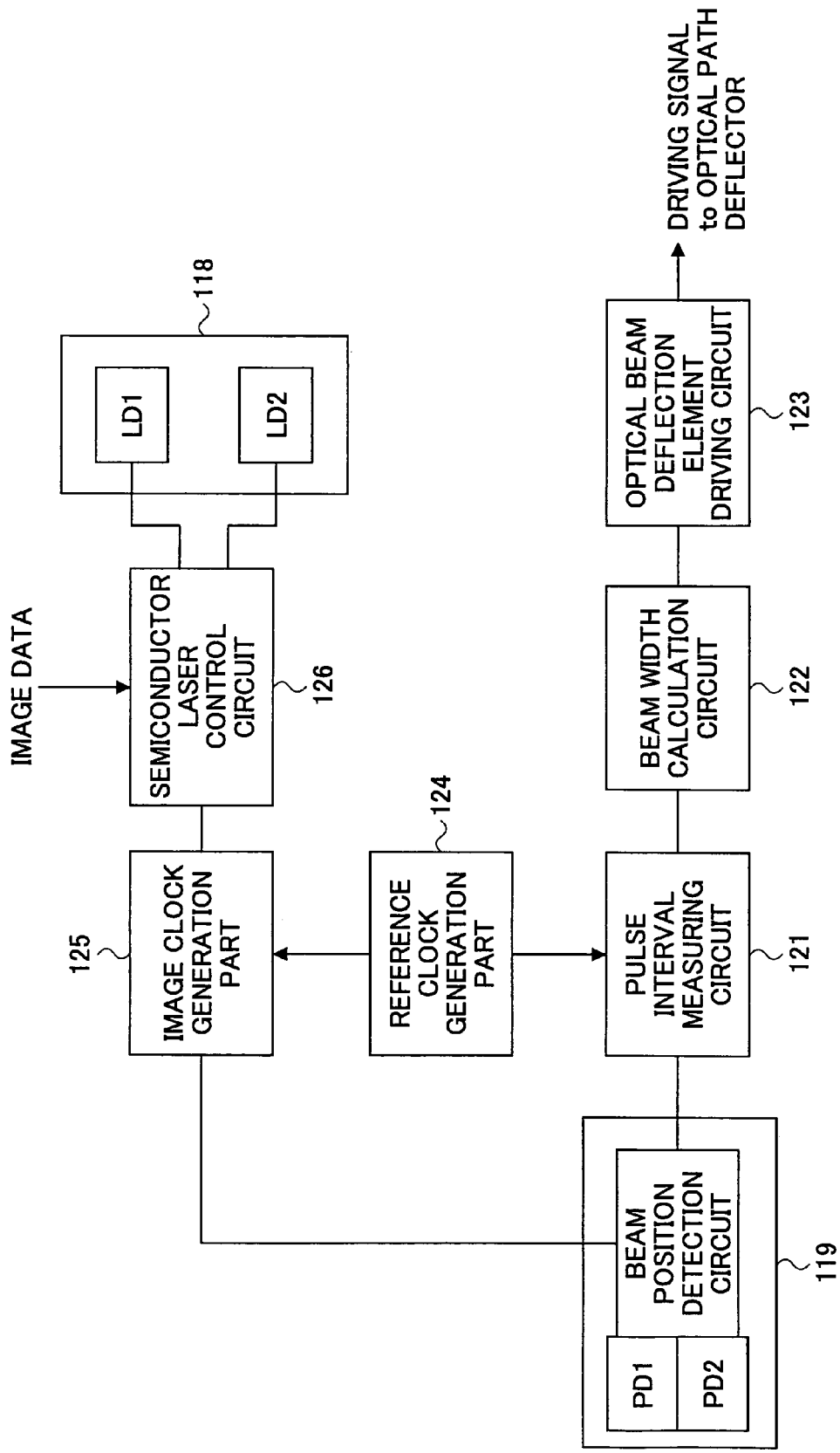
FIG. 14 shows a block diagram of another example of a control system for controlling the subscanning beam pitch.

FIG. 14 is a block diagram of a control system for controlling a beam pitch in the subscanning direction. This example is different from that shown in FIG. 13 in that 122 indicates a beam width calculation part. In this example, the pulse interval measuring circuit 121 measures the time interval T1 and the time interval T2 shown in FIG. 2B. Then, the beam width calculation circuit 122 calculates the pitch by using the equation (1), and compares the calculated pitch with a predetermined pitch. If the calculated pitch is different from the predetermined pitch by more than a predetermined value, the beam deflection element driving circuit 123 generates a driving signal that is applied to the optical beam deflection element 129, so that the wedge-shaped prism 130 is rotated by the ring ultrasonic motor 130 in the optical beam deflection element 129 such that the difference is corrected. For correcting only one beam, one wedge-shaped prism corresponding to the beam is corrected. For correcting two of the beams, two wedge-shaped prisms are corrected.

In the examples of FIGS. 13 and 14, a part or the whole of the circuits 121–126 may be included in the optical scanning apparatus, or may be included in an control part in an image forming apparatus having the optical scanning apparatus. The arrangements shown in FIGS. 13 and 14 also apply to the first embodiment.

In the above-mentioned example, if the pitch is different from a predetermined pitch, the optical scanning apparatus controls a correction mechanism to correct the pitch. In addition, an image forming apparatus may include a reporting part for reporting the shift of the pitch to an operator. For example, the reporting part may display a warning on an operation panel of the image forming apparatus.

[Application Example (1) of the Optical Scanning Apparatus]

In the following, an application example (1) of the above-mentioned optical scanning apparatus having the above-mentioned configuration is described in the following.

Figure 15:
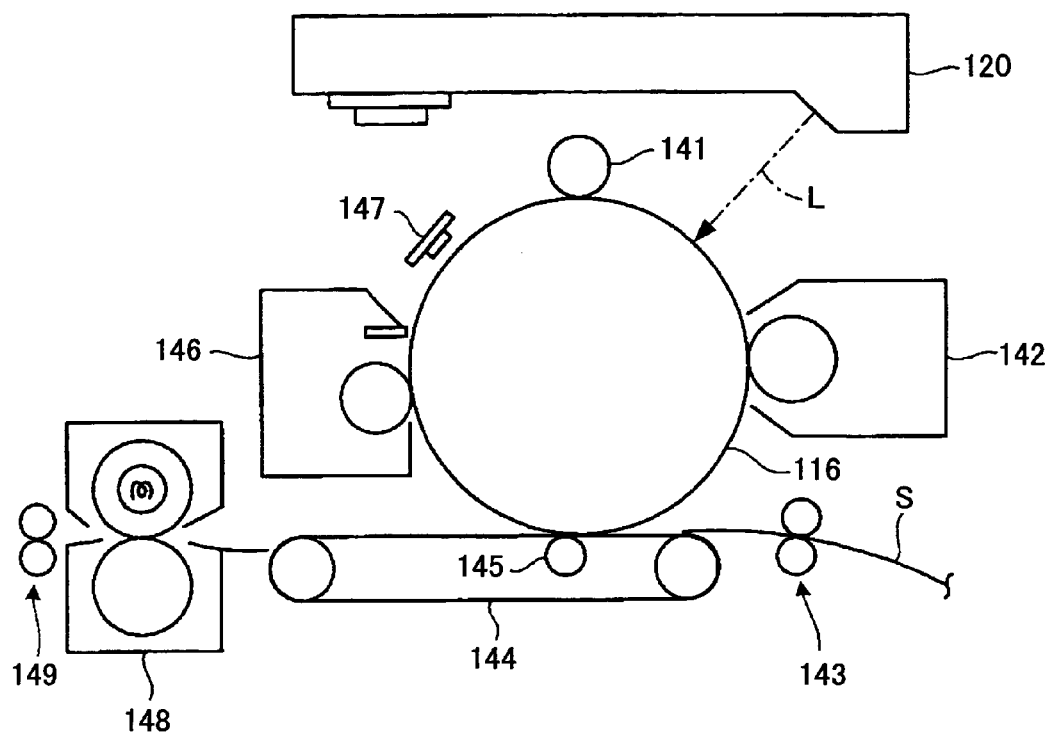
FIG. 15 is a block diagram of an image forming apparatus in which the optical scanning apparatus is used.

FIG. 15 is a block diagram of an image forming apparatus in which the optical scanning apparatus is used. The image forming apparatus includes a photosensitive drum 116 that is an example of an image carrier, a charging device (charging roller) 141 for charging the photosensitive drum 116, an optical writing part 120 (that is the optical scanning apparatus) for forming electrostatic latent image on the charged photosensitive drum 116 by irradiating optical beams on the drum 116, a developing part 142 for developing the electrostatic latent image by using a developer (such as a toner) to visualize the latent image, a transferring apparatus 144 for transferring the visualized image (toner image) on the photosensitive drum to a recording material (for example, recording paper) S, a fixing part 148 for fixing the toner image transferred to the recording material S, a cleaning part 146 for cleaning the toner and the like remained on the photosensitive drum 116 after the transfer is performed, and a static eliminator 147 for diselectrifying the photosensitive drum 116 after the cleaning. In the image forming apparatus, the above-mentioned optical scanning apparatus is provided as the optical writing part 120.

In the image forming apparatus, after the photosensitive drum 116 is charged uniformly by the charging part 141, each of the optical beams emitted from the semiconductor lasers 111a and 111b of the light source apparatus 118 is deflected by the deflection part 114 such as the polygon mirror, and the optical beam is concentrated on the photosensitive drum (scanned surface) 116 via the scanning optical system 115 to form a small optical spot. The optical spot scans the photosensitive drum 116 so that the electrostatic latent image is formed. Then, the latent image is developed by the developer (for example, toner) of the developing part 142 so that the image is visualized. In synchronization with the above image forming operation, a recording material S is provided from a feeder (not shown in the figure). Then, the recording material S is carried to a nip part (transferring part) between the photosensitive drum 116 and the transferring apparatus 144 (transferring belt) via a resist roller 143. After that, transferring bias is applied to the transferring bias roller 145 so that the toner image on the drum 116 is transferred to the recording material S. Then, the recording material S on which the toner image is transferred is moved to the fixing part 148 by the transferring apparatus (transferring belt) 144, so that the recording material S is heated under pressure by a fixing roller (or fixing belt and the like) of the fixing part 148 so that the toner image is fixed on the recording material S. The fixed recording material is ejected to an ejecting tray and the like (not shown in the figure) by the ejecting roller 149. In addition, remaining toner is cleaned from the photosensitive drum 116 after the toner image is transferred by the cleaning part 146 and the photosensitive drum 116 is diselectrified by the static eliminator 147.

In the image forming apparatus, by using an optical scanning apparatus for scanning a plurality of optical beams at the same time, printing speed and printing density can be increased. In addition, as mentioned before, since variations of the optical spot arrangement on the photosensitive drum 116 can be reduced, the quality of output images can be improved.

The timing for detecting the optical spot arrangement can be a time when an operator (or service man, user and the like) pushes a start button of the image forming apparatus for starting printout. Alternatively, the timing may be each time when a predetermined number of papers (several—several tens) are output in the case where many papers are output. In addition, a memory mechanism can be provided for storing an adjusting value (a previous value, for example) for controlling the optical beam deflection element 129 while any printout operation is not performed.

As mentioned above, when the optical scanning apparatus 120 is used as the optical writing part of the image forming apparatus, the image forming apparatus can be configured such that the image forming apparatus outputs an evaluation chart described in Japanese laid open patent application No. 10-62705.

By outputting the evaluation chart, the operator can check the quality of the output image so that the operator can correct the deterioration of the output image wherein the deterioration is not only due to influences of variation of the spot arrangement but also due to influences by processes of development/transferring/fixing.

In addition, one or both of the beam spot arrangement detection part and the control part can be omitted, so that the cost of the optical scanning apparatus can be reduced.

[Application Example (2) of the Optical Scanning Apparatus]

The optical scanning apparatus of this embodiment can be also used in a color image forming apparatus. In the color image forming apparatus such as a digital color compound machine and a color printer and the like, the tandem type is adopted often. Like the tandem type described in the first embodiment, in the tandem type, photosensitive parts (for example, photosensitive drums 116K, 116C, 116M and 116Y) corresponding to each color (black:K, cyan:C, magenta:M, yellow:Y) are arranged in series in a direction in which a recording paper is carried. More specifically, four image forming parts (each including the photosensitive drum 116, the charging part 141, the optical scanning apparatus 120, the developing part 142, the transferring bias roller 145, the cleaning part 146 and the static eliminator 147 and the like shown in FIG. 15) are arranged in series in the recording material carrying direction. In other words, the transferring apparatus 144 is provided in the carrying direction, and the four image forming parts are arranged along the transferring apparatus 144. Each image forming part forms an image of the corresponding color, and each image formed by the image forming parts is transferred to the recording material S carried by the transferring apparatus 144 wherein images are superimposed each other. Then, after the four color images are transferred, the image is fixed by the fixing part 148 so that a color image is formed. By using such configuration, the output color image can be obtained four times faster compared with an image forming apparatus having one photosensitive drum (in which writing is performed four times for transferring the four color images).

Regarding configurations of a color image forming apparatus, other than the above-mentioned configuration in which each color image generated by the corresponding image forming part is directly transferred to the recording material, a configuration can be adopted in which each color image is once transferred to an intermediate transferring body (intermediate transferring belt and the like), and after a color image is formed by superimposing the four color images on the intermediate transferring body, the color image is transferred to the recording medium at one time and is fixed so that a color image is obtained.

Figure 16A:
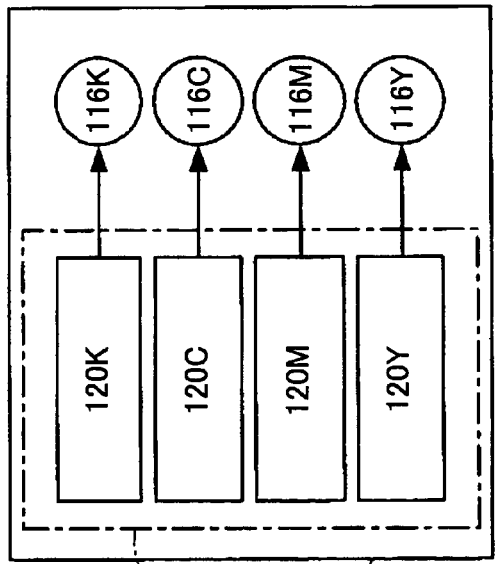
FIGS. 16A–16D show configurations of a tandem type color image forming apparatus.

As shown in FIG. 16A, when the configuration in which respective optical scanning apparatuses are provided for the four photosensitive drums is adopted, the optical scanning apparatuses are called 120K, 120C, 120M and 120Y respectively. In this case, when the number of the beam emitted from each of the optical scanning apparatuses 120K, 120C, 120M and 120Y is one, a full color (four colors) image can be obtained by using an image output apparatus in which the optical scanning apparatuses are used. Alternatively, at least one optical scanning apparatus (that is the optical scanning apparatus 120K for black) can be replaced with a four beam optical scanning apparatus. By performing scanning only by using the four beam optical scanning apparatus when a monochrome image is formed, the image forming apparatus can obtain four times higher density compared with a case when full color image is formed. In addition, by increasing the carrying speed (and process speed) of the recording material by four times, the number of output papers can be increased by four times. Even when the full color image is formed, character images are written by using black in many cases and a high resolution is required. Thus, by using the other color optical scanning apparatuses (120C, 120M, 120Y: 1 beam) in addition to the four beam optical scanning apparatus 120K for black, a higher quality output image can be obtained for an image in which character/picture/line image and the like are mixed.

Figure 16B:
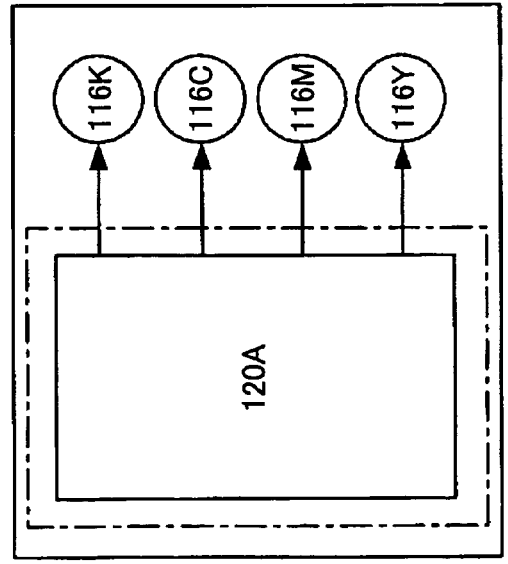
Figure 16C:
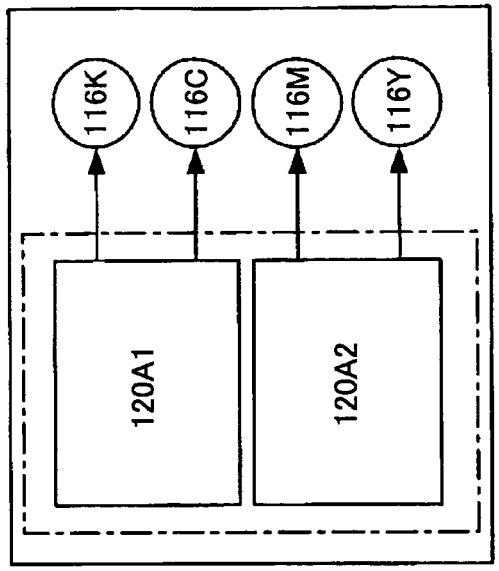
Figure 16D:
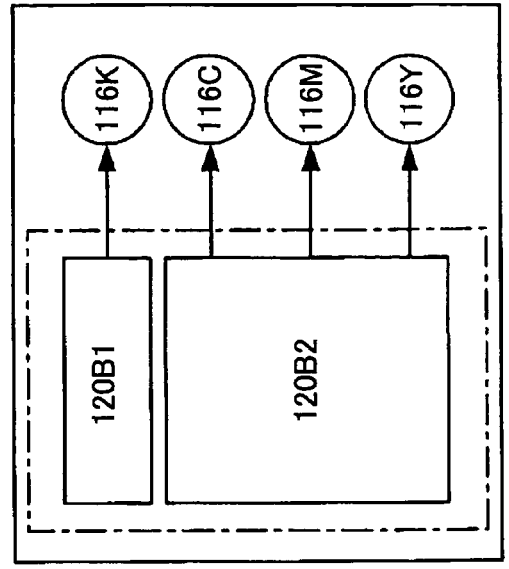

Although FIG. 16A shows a configuration including optical scanning apparatuses 120K, 120C, 120M and 120Y corresponding to the four photosensitive drums 116K, 116C, 116M and 116Y respectively, one or two optical scanning apparatuses may perform optical scanning for the four photosensitive drums 116K, 116C, 116M and 116Y. For example, FIG. 16B shows an example in which one optical scanning apparatus performs scanning for the four photosensitive drums 116K, 116C, 116M and 116Y. In this example, the optical scanning apparatus 120A includes four light source apparatuses, one deflection part and four scanning optical systems. This configuration corresponds to that of the first embodiment. Optical beams emitted from the four light source apparatuses are deflected by one deflection part, and the beams scan the four photosensitive drums 116K, 116C, 116M and 116Y via the four scanning optical systems. In addition, FIG. 16C shows an example in which two optical scanning apparatuses scan the four photosensitive drums 116K, 116C, 116M and 116Y respectively. In this example, each of the two optical scanning apparatuses 120A1 and 120A2 includes two light source apparatuses, one deflection part and two scanning optical systems. In the optical scanning apparatus 120A1, optical beams emitted from two light source apparatuses are deflected by using one deflection part, and the beams scan two photosensitive drums 116K and 116C via the two scanning optical systems. In the optical scanning apparatus 120A2, optical beams emitted from two light source apparatuses are deflected by using one deflection part, and the beams scan two photosensitive drums 116M and 116Y via the two scanning optical systems. Further, FIG. 16D shows an example in which two optical scanning apparatuses scan the black photosensitive drum 116K and other photosensitive drums 116C, 116M and 116Y. In this example, the optical scanning apparatus 120B1 includes one light source apparatus, one deflection part and one scanning optical system like the configuration shown in FIG. 10. The optical scanning apparatus 120B2 includes three light source apparatuses, one deflection part and three scanning optical systems. The optical scanning apparatus 120B1 deflects beams emitted from the light source apparatus with the deflection part and scans the black photosensitive drum 116K via the scanning optical system. The optical scanning apparatus 120B2 deflects beams emitted from the three light source apparatuses with the deflection part and scans the three photosensitive drums 116C, 116M and 116Y via the three scanning optical systems. By configuring the system shown in FIG. 16D such that the black optical scanning apparatus 120B1 emits four beams, high speed processing and high density can be obtained for monochrome image formation.

[Application Example (3) of the Optical Scanning Apparatus]

Figure 17:
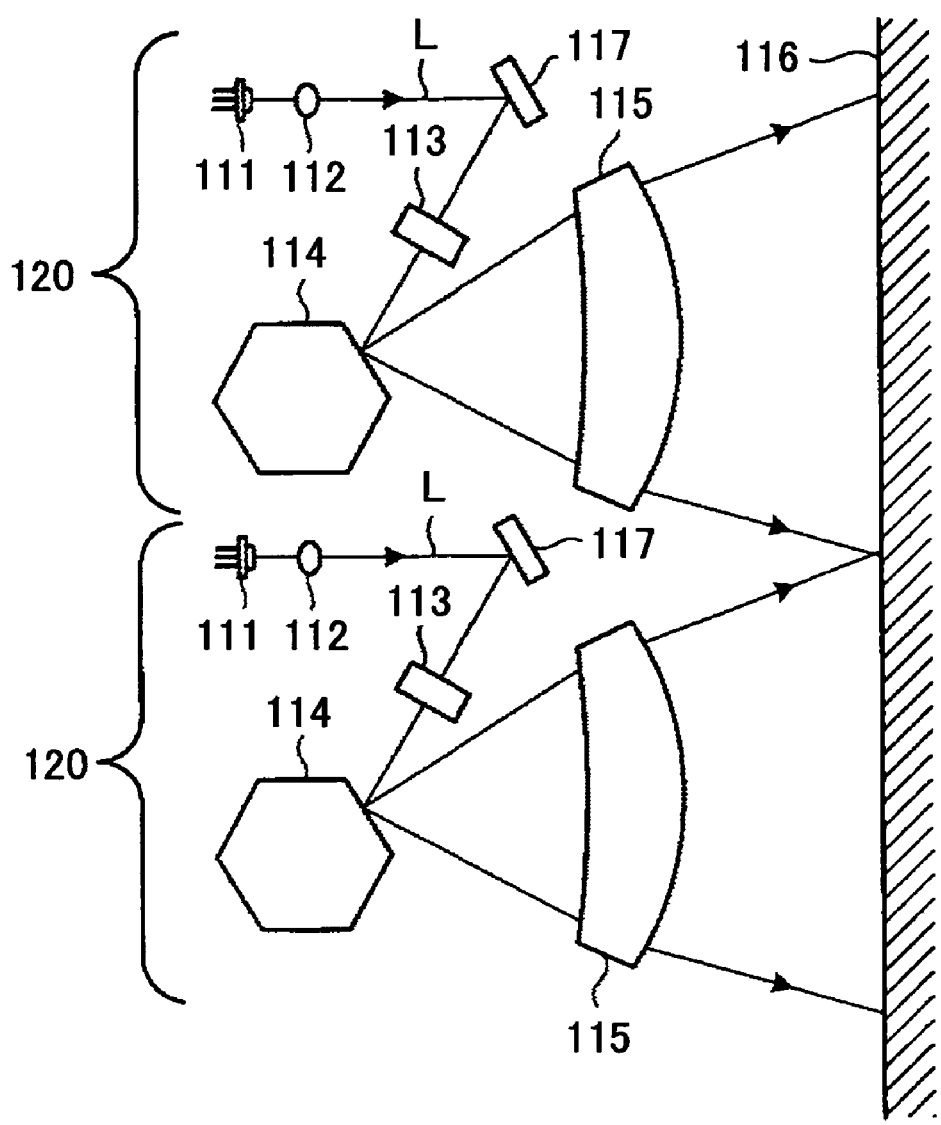
FIG. 17 shows an application example of the optical scanning apparatus.

FIG. 17 shows a further application example of the optical scanning apparatus. In this example, as shown in the figure, the optical scanning apparatuses 120 are arranged in parallel in the main scanning direction of the scanned surface so that the effective writing width is divided into two sections. When adopting such configuration, by using the optical scanning apparatuses of the present invention, the divided scanning lines can be connected smoothly. In addition, by arranging the optical scanning apparatuses 120 in parallel, the effective writing width can be increased, so that an image forming apparatus can be provided that can form an image on a wide paper such as A1, A0 and the like. Further, if the effective writing width is constant, optical elements and the deflection part can be downsized, so that beam waist position change due to mechanism tolerance or temperature change can be reduced, and wave aberration can be reduced and high quality images can be formed.

The optical scanning apparatus of the configuration of FIG. 17 can be applied to the color image forming apparatus shown in FIGS. 16A–16D. Thus, a color image forming apparatus that can form an image on a wide paper and a color image forming apparatus having high image quality can be provided.

According to the optical scanning apparatus of the present invention, by measuring and controlling a scanning position of an optical beam in the subscanning direction, a good image can be obtained in which shifts of the beam scanning position due to temperature change and vibration and the like can be reduced. When a plurality of optical beams are used, by measuring and controlling the pitch of the optical beams in the subscanning direction, a good image can be obtained in which the variation of the beam scanning position due to temperature change and vibration and the like can be reduced. Further, when a plurality of optical beams are used, by measuring and controlling the pitch of the optical beams in the subscanning direction, or by reporting shifts of the pitch to an operator and the like, a good image that does not include the beam scanning position shifts can be obtained easily. Therefore, by using the optical scanning apparatus as an optical writing part in an image forming apparatus, an image forming apparatus can be obtained that can output an image of high quality. By adopting the tandem configuration in which the image forming apparatuses are arranged, a color image forming apparatus can be obtained that can output a color image of high quality. Therefore, according to the present invention, a laser printer, a digital compound machine, a laser facsimile, a laser plotter and the like that can output an image of high quality can be provided. Other than the optical writing part of an image forming apparatus, the optical scanning apparatus of the present invention can be used in an image displaying apparatus using an optical scanning method. Further, the optical scanning apparatus can be used in a technical field of an optical measurement apparatus and the like.

As mentioned above, according to the present invention, an optical scanning apparatus is provided, in which it includes: a light source emitting an optical beam; an optical deflection unit deflecting the optical beam emitted from the light source; a scanning optical arrangement scanning a scanned surface by the optical beam in a main scanning direction; and an optical beam detection unit detecting the optical beam moving in the main scanning direction, the optical beam detection unit including a first photodetector and a second photodetector, and the first photodetector including a first part and a second part that are electrically connected, wherein a first gap is formed between an edge of the first part and a first edge of the second photodetector, a second gap is formed between an edge of the second part and a second edge of the second photodetector, and the first gap and the second gap are not parallel to each other.

The optical scanning apparatus may includes two or more optical beam detection units in a main scanning direction, wherein the optical scanning apparatus detects an inclination or a curve of a scanning line obtained by optical beam scanning in the main scanning direction by using the two or more optical beam detection units.

The optical scanning apparatus may further includes an arrangement obtaining a time interval from a time when a spot formed by the optical beam passes through the first gap to a time when the spot passes through the second gap to obtain a shift value of a position of the spot in a subscanning direction by using the time interval. The optical scanning apparatus may further includes a correction arrangement correcting the position of the spot in the subscanning direction on the basis of the shift value.

The correction arrangement may include a liquid crystal deflection element that deflects the optical beam on the basis of the shift value, wherein the liquid crystal deflection element is arranged such that the optical beam passes through the liquid crystal deflection element. Alternatively, the correction arrangement may include an attitude control unit for controlling an attitude of at least one optical element through which the optical beam passes. Alternatively, the correction arrangement may include a prism element that deflects the optical beam on the basis of the shift value, wherein the prism element is arranged such that the optical beam passes through the prism element.

The optical scanning apparatus may include an arrangement obtaining a first time interval from a time when a first spot formed by a first optical beam passes through the first gap to a time when the first spot passes through the second gap, and obtaining a second time interval from a time when a second spot formed by a second optical beam passes through the first gap to a time when the second spot passes through the second gap, and obtaining a spot interval between the first spot and the second spot in the subscanning direction by using the first time interval and the second time interval. The optical scanning apparatus may further include a correction arrangement correcting the spot interval on the basis of a difference between the spot interval and a predetermined spot interval. The optical scanning apparatus may further include an arrangement warning an operator when a difference between the spot interval and a predetermined spot interval is larger than a predetermined value.

In the optical scanning apparatus, each width of the first and second gaps is smaller than a radius of a spot formed by the optical beam, the first gap may be perpendicular to the main scanning direction, an output signal level of the first photodetector and an output signal level of the second photodetector may be different while any spot is not detected by the optical beam detection unit. The optical scanning apparatus may include a comparator comparing an output signal level of the first photodetector with an output signal level of the second photodetector, and outputting a signal at a time when the output signal levels are the same.

The present invention is not limited to the specifically disclosed embodiments, and variations and modifications may be made without departing from the scope of the present invention.

The present application contains subject matter related to Japanese patent application No. 2003-198922, filed in the JPO on Jul. 18, 2003 and Japanese patent application No. 2003-294246, filed in the JPO on Aug. 18, 2003, the entire contents of which being incorporated herein by reference.

What is claimed is:

1. An optical scanning apparatus comprising:
    a light source emitting an optical beam;
    an optical deflection unit deflecting the optical beam emitted from the light source;
    a scanning optical arrangement scanning a scanned surface by the optical beam in a main scanning direction; and
    an optical beam detection unit detecting the optical beam moving in the main scanning direction,
    the optical beam detection unit including a first photodetector and a second photodetector, and the first photodetector including a first part and a second part that are electrically connected,
    wherein a first gap is formed between an edge of the first part and a first edge of the second photodetector, a second gap is formed between an edge of the second part and a second edge of the second photodetector, and the first gap and the second gap are not parallel to each other.

2. The optical scanning apparatus as claimed in claim 1, the optical scanning apparatus including two or more optical beam detection units in a main scanning direction, wherein the optical scanning apparatus detects an inclination or a curve of a scanning line obtained by optical beam scanning in the main scanning direction by using the two or more optical beam detection units.

3. The optical scanning apparatus as claimed in claim 1, the optical scanning apparatus further including an arrangement obtaining a time interval from a time when a spot formed by the optical beam passes through the first gap to a time when the spot passes through the second gap to obtain a shift value of a position of the spot in a subscanning direction by using the time interval.

4. The optical scanning apparatus as claimed in claim 3, the optical scanning apparatus further including a correction arrangement correcting the position of the spot in the subscanning direction on the basis of the shift value.

5. The optical scanning apparatus as claimed in claim 4, the correction arrangement including a liquid crystal deflection element that deflects the optical beam on the basis of the shift value, wherein the liquid crystal deflection element is arranged such that the optical beam passes through the liquid crystal deflection element.

6. The optical scanning apparatus as claimed in claim 4, the correction arrangement including an attitude control unit for controlling an attitude of at least one optical element through which the optical beam passes.

7. The optical scanning apparatus as claimed in claim 4, the correction arrangement including a prism element that deflects the optical beam on the basis of the shift value, wherein the prism element is arranged such that the optical beam passes through the prism element.

8. The optical scanning apparatus as claimed in claim 1, the optical scanning apparatus further including an arrangement obtaining a first time interval from a time when a first spot formed by a first optical beam passes through the first gap to a time when the first spot passes through the second gap, and obtaining a second time interval from a time when a second spot formed by a second optical beam passes through the first gap to a time when the second spot passes through the second gap, and obtaining a spot interval between the first spot and the second spot in the subscanning direction by using the first time interval and the second time interval.

9. The optical scanning apparatus as claimed in claim 8, the optical scanning apparatus further including a correction arrangement correcting the spot interval on the basis of a difference between the spot interval and a predetermined spot interval.

10. The optical scanning apparatus as claimed in claim 9, the correction arrangement including a liquid crystal deflection element that deflects at least one of the first and second optical beams on the basis of the difference, wherein the liquid crystal deflection element is arranged such that the at least one of the first and second optical beams pass through the liquid crystal deflection element.

11. The optical scanning apparatus as claimed in claim 9, the correction arrangement including an attitude control unit for controlling an attitude of at least one optical element through which at least one of the first and second optical beams pass.

12. The optical scanning apparatus as claimed in claim 9, the correction arrangement including a prism element that deflects at least one of the first and second optical beams on the basis of the difference, wherein the prism element is arranged such that the at least one of the first and second optical beams pass through the prism element.

13. The optical scanning apparatus as claimed in claim 8, the optical scanning apparatus further including an arrangement warning an operator when a difference between the spot interval and a predetermined spot interval is larger than a predetermined value.

14. The optical scanning apparatus as claimed in claim 1, wherein each width of the first and second gaps is smaller than a radius of a spot formed by the optical beam.

15. The optical scanning apparatus as claimed in claim 1, wherein the first gap is perpendicular to the main scanning direction.

16. The optical scanning apparatus as claimed in claim 1, wherein an output signal level of the first photodetector and an output signal level of the second photodetector are different while any spot is not detected by the optical beam detection unit.

17. The optical scanning apparatus as claimed in claim 1, the optical scanning apparatus further including a comparator comparing an output signal level of the first photodetector with an output signal level of the second photodetector, and outputting a signal at a time when the output signal levels are the same.

18. An optical scanning apparatus comprising two or more optical scanning units aligned in the main scanning direction, wherein each optical scanning unit scans a part of one scanning line and the two or more optical scanning units scan the one scanning line,
    each optical scanning unit comprising:
    a light source emitting an optical beam;

an optical deflection unit deflecting the optical beam emitted from the light source;

a scanning optical arrangement scanning a scanned surface by the optical beam in a main scanning direction; and an optical beam detection unit detecting the optical beam moving in the main scanning direction, the optical beam detection unit including a first photodetector and a second photodetector, and the first photodetector including a first part and a second part that are electrically connected, wherein a first gap is formed between an edge of the first part and a first edge of the second photodetector, a second gap is formed between an edge of the second part and a second edge of the second photodetector, and the first gap and the second gap are not parallel to each other.

19. An image forming apparatus comprising:

an image carrier;

a charging unit charging the image carrier;

an optical scanning apparatus forming a latent image on the image carrier by emitting an optical beam;

a developing unit developing the latent image to form a visualized image;

a transferring unit transferring the visualized image to a recording material directly or via an intermediate transferring material, the optical scanning apparatus comprising:

a light source emitting the optical beam;

an optical deflection unit deflecting the optical beam emitted from the light source;

a scanning optical arrangement scanning the image carrier by the optical beam in a main scanning direction; and an optical beam detection unit detecting the optical beam moving in the main scanning direction, the optical beam detection unit including a first photodetector and a second photodetector, and the first photodetector including a first part and a second part that are electrically connected, wherein a first gap is formed between an edge of the first part and a first edge of the second photodetector, a second gap is formed between an edge of the second part and a second edge of the second photodetector, and the first gap and the second gap are not parallel to each other.

20. A color image forming apparatus comprising two or more image forming apparatuses each corresponding to a color, each image forming apparatus comprising:

an image carrier;

a charging unit charging the image carrier;

an optical scanning apparatus forming a latent image on the image carrier by emitting an optical beam;

a developing unit developing the latent image to form a visualized image;

a transferring unit transferring the visualized image to a recording material directly or via an intermediate transferring material, the optical scanning apparatus comprising:

a light source emitting the optical beam;

an optical deflection unit deflecting the optical beam emitted from the light source;

a scanning optical arrangement scanning the image carrier by the optical beam in a main scanning direction; and an optical beam detection unit detecting the optical beam moving in the main scanning direction, the optical beam detection unit including a first photodetector and a second photodetector, and the first photodetector including a first part and a second part that are electrically connected, wherein a first gap is formed between an edge of the first part and a first edge of the second photodetector, a second gap is formed between an edge of the second part and a second edge of the second photodetector, and the first gap and the second gap are not parallel to each other.

21. A color image forming apparatus comprising a light source emitting an optical beam, an optical deflection unit deflecting the optical beam emitted from the light source, and two or more image forming arrangements each corresponding to a color, each image forming arrangement comprising:

an image carrier;

a charging unit charging the image carrier;

an optical scanning unit forming a latent image on the image carrier by using the optical beam;

a developing unit developing the latent image to form a visualized image;

a transferring unit transferring the visualized image to a recording material directly or via an intermediate transferring material, the optical scanning unit comprising:

a scanning optical arrangement scanning the image carrier by the optical beam in a main scanning direction; and an optical beam detection unit detecting the optical beam moving in the main scanning direction, the optical beam detection unit including a first photodetector and a second photodetector, and the first photodetector including a first part and a second part that are electrically connected, wherein a first gap is formed between an edge of the first part and a first edge of the second photodetector, a second gap is formed between an edge of the second part and a second edge of the second photodetector, and the first gap and the second gap are not parallel to each other.

22. A method used for detecting a subscanning direction position shift of an optical beam that scans a scanned surface in an optical scanning apparatus by using an optical beam detection unit, for detecting the optical beam moving in main scanning direction, including a first gap and a second gap that are not parallel to each other, the method comprising the steps of:

obtaining a time interval from a time when a spot formed by the optical beam passes through the first gap to a time when the spot passes through the second gap;

obtaining a difference between the time interval and a predetermined time interval; and detecting the subscanning direction position shift of the spot from a predetermined position by using the difference.

23. The method as claimed in claim 22 further comprising the step of correcting a position of the spot in the subscanning direction on the basis of the subscanning direction position shift.

24. A method used for detecting a subscanning direction interval between optical beams that scan a scanned surface in an optical scanning apparatus by using an optical beam detection unit, for detecting the optical beam moving in main scanning direction, including a first gap and a second gap that are not parallel to each other, the method comprising the steps of:

obtaining a first time interval from a time when a first spot formed by a first optical beam passes through the first gap to a time when the first spot passes through the second gap;

obtaining a second time interval from a time when a second spot formed by a second optical beam passes through the first gap to a time when the second spot passes through the second gap; and obtaining a spot interval between the first spot and the second spot in the subscanning direction by using the first time interval and the second time interval.

25. The method as claimed in claim 24, wherein the spot interval $\Delta P$ is calculated by an equation: $\Delta P = v \times (T2-T1)/\tan \theta$, wherein T1 is the first time interval, T2 is the second time interval, v is a scanning speed in the main scanning direction, and $\theta$ is an angle between the first gap and the second gap.

26. The method as claimed in claim 24 further comprising the step of correcting the spot interval on the basis of a difference between the spot interval and a predetermined spot interval.

27. A method used for detecting a subscanning direction position shift of an optical beam that scans a scanned surface in an optical scanning apparatus by using an optical beam detection unit, for detecting the optical beam moving in a main scanning direction, including two photodetectors forming a first gap and a second gap that are not parallel to each other, the method comprising the steps of:

obtaining a time interval from a time when a spot formed by the optical beam passes through the first gap to a time when the spot passes through the second gap by obtaining a time interval between cross points of output signals of the two photodetectors;

obtaining a difference between the time interval and a predetermined time interval; and detecting the subscanning direction position shift of the spot from a predetermined position by using the difference.

* * * * *